United States Patent
Huff et al.

(10) Patent No.: US 7,849,599 B2
(45) Date of Patent: Dec. 14, 2010

(54) IMPUTING STRENGTH GRADIENT IN PRESSURE VESSELS

(75) Inventors: Philip A. Huff, Spring, TX (US); Shafiq Khandoker, Houston, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 825 days.

(21) Appl. No.: 11/680,860

(22) Filed: Mar. 1, 2007

(65) Prior Publication Data

US 2008/0078554 A1   Apr. 3, 2008

Related U.S. Application Data

(63) Continuation-in-part of application No. 11/626,148, filed on Jan. 23, 2007, now abandoned, and a continuation-in-part of application No. 11/555,984, filed on Nov. 2, 2006, now abandoned, and a continuation-in-part of application No. 11/528,873, filed on Sep. 28, 2006, now Pat. No. 7,721,401.

(51) Int. Cl.
| | |
|---|---|
| *B21D 51/16* | (2006.01) |
| *C21D 6/00* | (2006.01) |
| *C21D 8/00* | (2006.01) |
| *C22C 38/00* | (2006.01) |
| *E21B 7/12* | (2006.01) |
| *E21B 33/06* | (2006.01) |

(52) U.S. Cl. ............... 29/890.12; 29/890.131; 148/328; 148/559; 148/607; 148/622; 148/663; 166/363; 251/1.1

(58) Field of Classification Search .............. 29/407.01, 29/407.05, 407.08, 890.032, 890.12, 890.124, 29/890.131, 890.132, 428; 148/519, 559, 148/607, 622, 663, 328; 251/1.1, 1.3; 427/383.7; 166/363, 250.01, 250.08, 250.1

See application file for complete search history.

(56) References Cited

U.S. PATENT DOCUMENTS 2,609,836 A    9/1952   Knox (Continued)

FOREIGN PATENT DOCUMENTS

JP    57104647    6/1982

(Continued)

OTHER PUBLICATIONS

Office Action for Related U.S. Appl. No. 11/528,873 mailed Jun. 10, 2009.

(Continued)

*Primary Examiner*—David P Bryant
*Assistant Examiner*—Alexander P Taousakis
(74) *Attorney, Agent, or Firm*—Potomac Patent Group PLLC

(57) ABSTRACT

A process to manufacture an oilfield component comprises selectively reinforcing a base material with an age-hardenable clad material and age-hardening the clad material for a selected time and at a selected temperature profile, wherein the age-hardening results in the clad material developing a selected strength gradient. A body of a ram blowout preventer comprises, a low-ally base material, a vertical bore through the body, and a horizontal bore through the body intersecting the vertical bore, wherein at least a portion of the body is selectively reinforced with a clad material, and wherein the clad material is age-hardened for a selected time and at a selected temperature profile resulting in the clad material developing a selected strength gradient.

7 Claims, 11 Drawing Sheets

U.S. PATENT DOCUMENTS

| | | | |
|---|---|---|---|
| 2,834,702 A | | 5/1958 | Gibb |
| 3,642,519 A | * | 2/1972 | Tiner et al. ................... 148/512 |
| 3,667,721 A | | 6/1972 | Vujasinovic |
| 4,347,898 A | | 9/1982 | Jones |
| 4,647,002 A | | 3/1987 | Crutchfield |
| 4,702,321 A | | 10/1987 | Horton |
| 5,655,745 A | | 8/1997 | Morrill |
| 5,665,745 A | | 9/1997 | Alt et al. |
| 5,806,314 A | | 9/1998 | Younes |
| 5,819,013 A | | 10/1998 | Miyazaki et al. |
| 5,839,511 A | | 11/1998 | Williams |
| 5,897,094 A | | 4/1999 | Brugman et al. |
| 5,997,665 A | | 12/1999 | Brisson et al. |
| 6,171,415 B1 | * | 1/2001 | Statnikov ................... 148/525 |
| 6,173,770 B1 | | 1/2001 | Morrill |
| 6,244,560 B1 | | 6/2001 | Johnson |
| 6,403,235 B1 | | 6/2002 | Glidden et al. |
| 6,554,247 B2 | | 4/2003 | Berckenhoff et al. |
| 6,737,174 B1 | | 5/2004 | Bianchi et al. |
| 6,878,412 B2 | * | 4/2005 | Hebeisen et al. ............ 427/456 |
| 6,884,959 B2 | | 4/2005 | Gandy et al. |
| 6,915,856 B2 | * | 7/2005 | Gentry et al. ................ 166/382 |
| 7,128,949 B2 | * | 10/2006 | Keener et al. ............ 427/385.5 |
| 2008/0078081 A1 | | 4/2008 | Huff et al. |
| 2008/0105340 A1 | | 5/2008 | Huff et al. |
| 2008/0105341 A1 | | 5/2008 | Huff et al. |

FOREIGN PATENT DOCUMENTS

| | | |
|---|---|---|
| JP | 61170551 | 8/1986 |
| JP | 01182505 | 7/1989 |
| JP | 2004162130 | 6/2004 |

OTHER PUBLICATIONS

Office Action for Related U.S. Appl. No. 11/555,984 mailed Mar. 4, 2009.

International Search Report and Written Opinion dated Jan. 18, 2008 issued in related International Application No. PCT/US2007/079461, 10 pages.

Office Action for Related U.S. Appl. No. 11/626,148 mailed Jun. 18, 2009.

International Search Report and Written Opinion dated Oct. 30, 2008 issued in corresponding international Application No. PCT/US2007/083528, 10 pages.

English language abstract of JP1182505 from esp@cenet, published Jul. 20, 1989, 1 page.

English language abstract of JP2004162130 from esp@cenet, published Jun. 10, 2004, 1 page.

English language abstract of 57104647 from esp@cenet, published Jun. 29, 1982, 1 page.

English language abstract of JP61170551 from esp@cenet, published Aug. 1, 1986, 1 page.

US Office Action issued in corresponding U.S. Appl. No. 11/555,984 on Sep. 4, 2009.

US Office Action issued in corresponding U.S. Appl. No. 11/626,148 on Jun. 18, 2009.

PCT International Search Report and Written Opinion of the International Searching Authority dated Apr. 23, 2008, 14 pages.

* cited by examiner

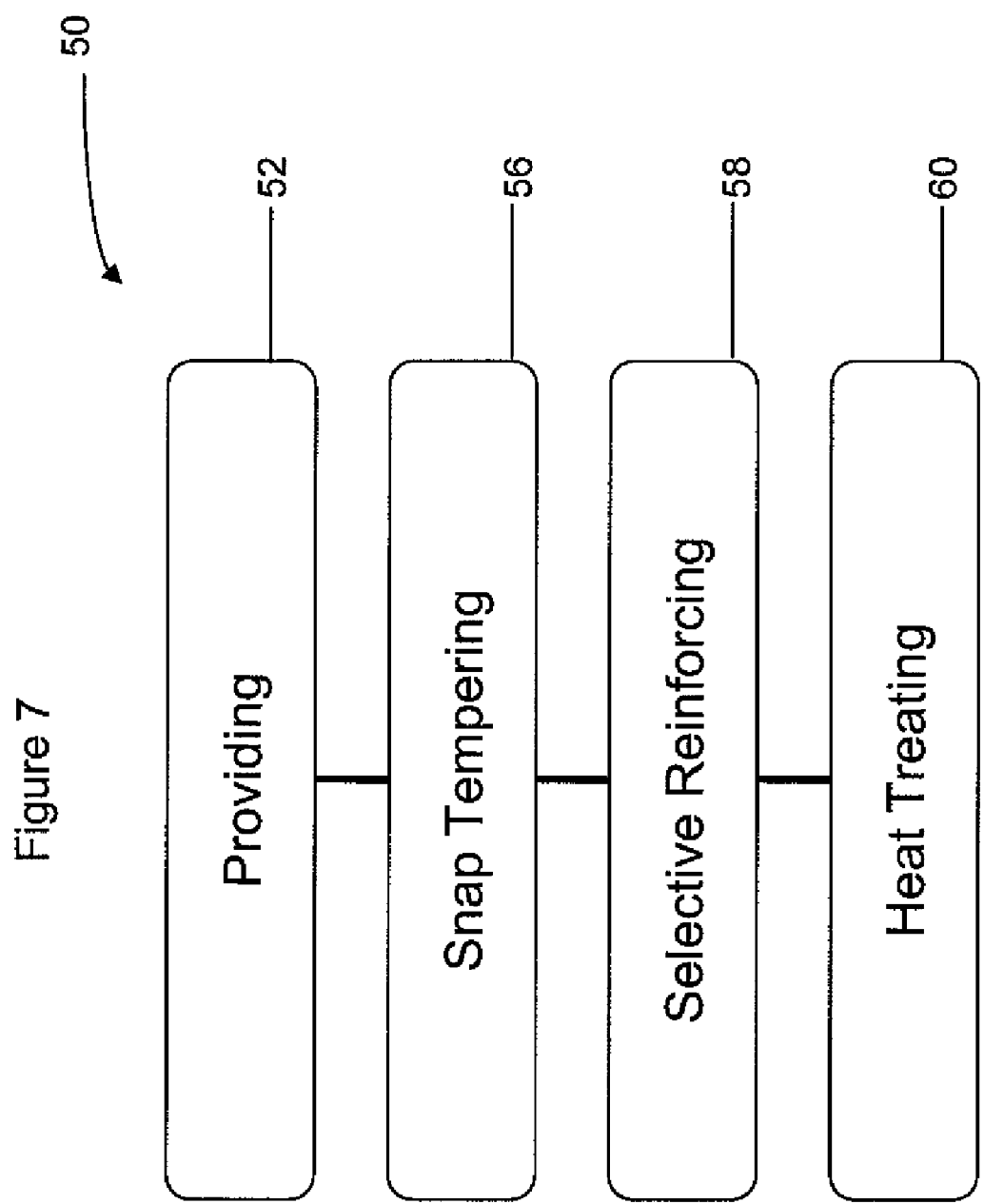

IMPUTING STRENGTH GRADIENT IN PRESSURE VESSELS

CROSS-REFERENCE TO RELATED APPLICATIONS

The present application claims the benefit, pursuant to 35 U.S.C. §120, as a Continuation-In-Part application of U.S. patent application Ser. No. 11/528,873, filed on Sep. 28, 2006, now U.S. Pat. No. 7,721,401, and entitled "Reinforcement of Irregular Pressure Vessels." Furthermore, the present application claims the benefit, pursuant to 35 U.S.C. §120, as a Continuation-In-Part application of U.S. patent application Ser. No. 11/555,984, filed on Nov. 2, 2006, and entitled "Heat Treatment Method of Inlaid Pressure Vessels." Further still, the present application claims the benefit, pursuant to 35 U.S.C. §120, as a Continuation-In-Part application of U.S. patent application Ser. No. 11/626,148, filed on Jan. 23, 2007, and entitled "Heat Treatment Method of Inlaid Pressure Vessels." All three Applications are expressly incorporated by reference in their entirety.

BACKGROUND OF THE DISCLOSURE

1. Field of the Disclosure

Embodiments disclosed herein relate generally to oilfield components and equipment used during oil and gas production. Specifically, embodiments disclosed herein relate to a method of heat treating oilfield components.

2. Background Art

A variety of designs exist for the drilling and production of hydrocarbons, including onshore and offshore drilling and production units. Offshore drilling and production unit designs may vary based upon water depth and the type of platform used, such as floating platforms, semi-submersible platforms, tension leg platforms, spar-type platforms, and others as are known in the art. Offshore units also vary in the type and location of control devices, including wet-tree systems, where the control devices are located atop a wellhead on the sea floor, and dry-tree systems, where the control devices are located on the platform.

Components used during the drilling and production of oil wells, regardless of the location and design, are subject to corrosion, wear, and fatigue. For example, with respect to offshore drilling and production, components and equipment used are subject to a dynamic environment, where near-surface and sub-surface currents may impart bending, tension, and/or rotational stress. In a typical deepwater offshore production, for example, a riser extends between a floating platform, at the surface of the ocean, and the wellhead, at the sea floor. Because the wellhead is statically located at the sea floor and the riser and the platform or drilling rig are motive, the imparted stresses may fatigue production components, including buoyancy devices, stress-relief subs, pad-eye connections for ballast or tension lines, stress joints, blowout preventers ("BOPs"), well control assemblies, mud lift modules, ballast weights, and other components known in the art. Each of these components, including the connections at the platform, the riser joints, and the wellhead components, may experience stress and strain associated with the dynamics of the offshore environment.

As another example of components subject to wear, corrosion, and fatigue, "rod" pumps are often used during the production of oil and gas from a reservoir. This deep well pump is mechanically activated by a walking beam pumping unit which is connected by one end to a power source and by the other end to a string of steel rods (e.g., sucker rods) that interconnect themselves to form a string of rods extending to the inside of the well, with the string connected by its other end to the deep well pump. During pumping, the string of rods performs a reciprocating or rotating movement, which may produce deflections of the string. The sucker rods are thereby subjected to wear due to frictional contact with the inner wall of the production tubing. Even though the fluid environment serves as a lubricant, abrasion does occur over the surface of the sucker rods. Additionally, tools used during assembly, such as those used for centering the string, may cause tearing of the rod surface. In the case of hydrocarbon wells, the fluid includes dissolved salts and undissolved minerals which may have an additional abrasive effect on the rod surface. At the same time that abrasion occurs, the metal in the sucker rods is subjected to a hard corrosive attack caused by downhole chemicals. These rods also experience very high cyclic axial tension over their service life and may be subject to axial fatigue.

In addition to the dynamic, abrasive, and corrosive stresses briefly described above, oilfield components may also be subject to fatigue due to the high pressures and temperatures encountered during the drilling and production process. The process of drilling wells involves penetrating a variety of subsurface geologic structures, or layers called "formations." Occasionally, a wellbore will penetrate a formation having a formation pressure substantially higher than the pressure maintained in the wellbore. When this occurs, the well is said to have "taken a kick," The pressure increase associated with the kick is generally produced by an influx of formation fluids (which may be a liquid, a gas, or a combination thereof) into the wellbore. The relatively high pressure kick tends to propagate from a point of entry in the wellbore uphole (from a high pressure region to a low pressure region). The normal operating pressures and the high pressure kicks subject the oilfield components to additional fatigue.

In the past, oilfield components subject to fatigue loading conditions were manufactured from a single metallic alloy. The alloys normally utilized are generally low-alloy steels processed by heat treatment to the mechanical properties suited to the loading conditions. The use of a high strength nickel-based alloy in the manufacture of these parts would normally be cost prohibitive.

In many cases, these oilfield components may need to meet the design criteria for metallic oil and gas field components, such as those requirements established by NACE International (formerly the National Association of Corrosion Engineers) and the European Federation of Corrosion for the performance of metals when exposed to various environmental compositions, pH, temperature, and $H_2S$ partial pressures. For example, NACE MR0175 limits the maximum hardness of the parts to Rockwell C 22 or Brinell 237 for low-alloy steels in the quenched and tempered condition.

For most low-alloy steels, the maximum yield strength that they are able to reach under the NACE maximum hardness limitation is about 80,000-90,000 psi. Very few low-alloy steels are able to develop this yield strength and hardness combination in a section thickness having any useable significant size. For example, when the section thickness is more than four to six inches, many low-alloy steels cannot develop the desired mechanical properties on quench and temper throughout their entire section thickness at the time of heat treatment.

Since fatigue life may be affected by the amount of stress imposed on a material relative to its yield strength, many materials exhibit a shorter life in fatigue when the stress applied exceeds as low as 50% of its yield strength. Consequently, if the parts are used in fatigue loading conditions such as those defined in NACE MR0175, the allowable applied stress may be limited to 50 to 65 ksi or less.

If fatigue failure occurs at these stress levels, there is little that may be done other than to reduce the applied stress by reducing the load on the part. Because the mechanical strength of the alloy cannot be increased significantly without exceeding the maximum hardness value mandated by NACE MR0175, reducing the applied stress was the only solution formerly available. Furthermore, fatigue strength is dependent on ductility as well. Thus, because ductility and strength are inversely related material properties, raising the strength of a material to accommodate fatigue properties may be counterproductive.

Fatigue failure is a phenomenon that results from high tensile stress at the surface or within close proximity to the surface of a material. Therefore, surface modification procedures, such as shot peening, case hardening by nitriding or carburizing, and flame hardening or induction hardening, have been used to increase the fatigue strength of a material by leaving a residual compressive stress at the surface. Parts that contain a residual compressive stress at their surface are less likely to fail in fatigue since cracking is more difficult to initiate and/or propagate when the part is residually loaded in compression.

While these surface modification procedures may aid in reducing or eliminating fatigue failures, shot peening and nitriding are superficial while carburizing and flame or induction hardening generally are not capable of modifying the material properties to depths below the surface of more than approximately 0.050 inches. Furthermore, these surface modification methods may be at odds with or violate the requirements of NACE MR0175 for use of the equipment in sour service or seawater environments. For example, the hardness induced on the surface or near subsurface of a part may be in excess of the threshold value for sulfide or chloride stress corrosion cracking.

As mentioned above, the lifespan of an oilfield component may also be affected by corrosion, such as by exposure to $H_2S$. For many years, parts in the oil tool industry have been clad overlaid on the ring grooves, sealing areas, and wetted surfaces solely for the prevention of damage to the base metal from the well bore fluid. For example, U.S. Pat. No. 6,737,174 discloses a sucker rod having a surface coated by a copper alloy. In other clad overlay processes, a corrosion resistant alloy ("CRA") clad layer, such as nickel based Alloy 625 (i.e., INCONEL 625) has been applied in thicknesses nominally from 0.060 to 0.187 inches to protect a base metal from corrosive attack. Other CRAs may be used in these applications, but the industry has essentially standardized Alloy 625 for CRA cladding of oil tool equipment. There has been little if any attention paid to the strength of the cladding material except to assure that the strength of clad layer material is equal to or greater than the strength of the base metal in the part.

Oilfield components and parts having an increased service life are desired, including parts subject to high temperatures, corrosive fluids, high stress levels, and/or fatigue loading conditions, including cyclic loading conditions. Accordingly, there exists a need for oilfield components that have improved performance under various extreme operating conditions, including fatigue loading conditions.

In the prior art, ram and annular BOP bodies, as well as accessory equipment, have typically been manufactured for use in operating pressures up to 15,000 psi and temperatures up to 250° F. Examples of annular blowout preventers are disclosed in U.S. Pat. Nos. 2,609,836 and 5,819,013, each of which is incorporated herein by reference in their entireties.

Examples of ram type blowout preventers are disclosed in U.S. Pat. Nos. 6,554,247, 6,244,560, 5,897,094, 5,655,745, and 4,647,002, each of which is incorporated herein by reference in their entireties. These BOP bodies may be manufactured using one-piece, rough machined, and heat treated low-alloy steel forgings or multiple piece low-alloy steel forgings that have been rough machined, heat treated and fabrication welded together. Castings have been and still may be used for the manufacture of these ram BOP bodies for these service conditions as well as forgings.

In the prior art, one-piece single, dual, or triple ram BOP bodies, which may be produced from low-alloy steel Grade F22, are quenched and final-tempered to meet the final material specification requirements. Alternatively, fabricated BOP bodies may be fabricated by welding together low-alloy steel Grade 8630 Modified quenched and final-tempered parts. The bodies are then machined to near net shape and weld overlaid with a corrosion resistant alloy, such as, AISI 316 austenitic stainless steel or nickel base Alloy 625 in the API ring grooves, bonnet faces and internal top seal area and other areas designated on the engineering drawings.

After fabrication welding and/or overlay welding, the BOP bodies are conventionally given a post-weld heat treatment ("PWHT") at a temperature dependant on the steel grade from which the parts have been produced. The purpose of the PWHT is primarily to reduce the hardness of the heat affected zone ("HAZ") of welded areas to the maximum hardness levels mandated by NACE MR0175 of HRC 22 or Brinell 237 for resistance to sulfide stress corrosion cracking ("SCC").

This PWHT is mandated by the controlling welding specification, ASME Section IX, to be performed at a temperature below the tempering temperature of the base metal itself. The PWHT operation tends to reduce the mechanical properties of the base metal and limits the number of times that a particular BOP body can be welded and post-weld heat treated before the mechanical properties of the base metal have been degraded to a level below the minimum requirements for the base metal required for the part. After the PWHT operation has been performed, the bodies are then finish machined to their final dimensional configuration.

As detailed in the current disclosure, the prior art manufacturing procedure may be changed to use a high strength, age hardenable, corrosion resistant alloy, CRA, to selectively reinforce areas of the one piece body for encapsulation of the high surface or near subsurface stresses in the BOP body. This change may allow manufacture of BOP bodies for use at operating pressures above 15,000 psi and at operating temperatures up to 350° F. and above.

However, if the prior art method of manufacture were used, as described above, the PWHT temperature would be sufficient to obtain the required maximum HAZ hardness value but the PWHT temperature would be too low to obtain the required mechanical properties in the age hardenable CRA overlay material. If the PWHT temperature were increased to obtain the mechanical properties in the CRA overlay material, the PWHT temperature would equal or surpass the tempering temperature of the Grade F22 base material of the BOP body, which is prohibited by ASME Section IX.

For example, where the CRA filler metal for the clad overlay weld deposition is INCONEL 725 and the base material is Grade F22 low-alloy steel, the Grade F22 steel must be post-weld heat treated at a minimum temperature of 1150° F. (621° C.) for a period of time ranging from four to eight hours or more. The Grade F22 low-alloy steel with section thickness of eight inches and greater will be quenched and tempered to develop a minimum yield strength of 85,000 psi. To develop this minimum yield strength requires a tempering temperature of 1150° F. to 1250° F. (621° C. to 677° C.) for a period of time of eight to ten hours or more. However, since the INCONEL 725 is an age hardenable alloy, in order to develop its mechanical properties on the order of 120,000 psi minimum yield strength, it must be aged at a temperature of 1200° F. (649° C.) for a minimum period of time of eight to twenty four hours. All of these various tempering temperatures and times, PWHT temperatures and times, and the age hardening temperatures and times may be in conflict with one another.

If the base metal is conventionally quenched and final-tempered as described above, the age hardening temperature and time for the INCONEL 725 would further temper the Grade F22 base metal, likely lowering its mechanical properties below the minimum specification requirement. If the INCONEL 725 weldment joint on the Grade F22 were PWHT as described above, the maximum HAZ hardness would be met and the mechanical properties of the Grade F22 would be preserved, but the INCONEL 725 weld metal would likely not develop the mechanical properties in the overlay that are desired.

Accordingly, there exists a need for methods of manufacture to obtain parts meeting the requirements for HAZ hardness and mechanical properties for both the base metal and the clad overlay for use in oilfield service.

SUMMARY OF INVENTION

In one aspect, embodiments disclosed herein relate to a process to manufacture an oilfield component comprising selectively reinforcing a base material with an age-hardenable clad material and age-hardening the clad material for a selected time and at a selected temperature profile, wherein the age-hardening results in the clad material developing a selected strength gradient.

In another aspect, embodiments disclosed herein relate to a body of a ram blowout preventer comprising a low-alloy base material, a vertical bore through the body, a horizontal bore through the body intersecting the vertical bore, wherein at least a portion of the body is selectively reinforced with a clad material, and wherein the clad material is age-hardened for a selected time and at a selected temperature profile resulting in the clad material developing a selected strength gradient.

Other aspects and advantages will be apparent from the following description and the appended claims.

BRIEF DESCRIPTION OF DRAWINGS

FIG. 7 is a block diagram of a process to manufacture an oilfield component in accordance with embodiments disclosed herein.

DETAILED DESCRIPTION

Figure 1:
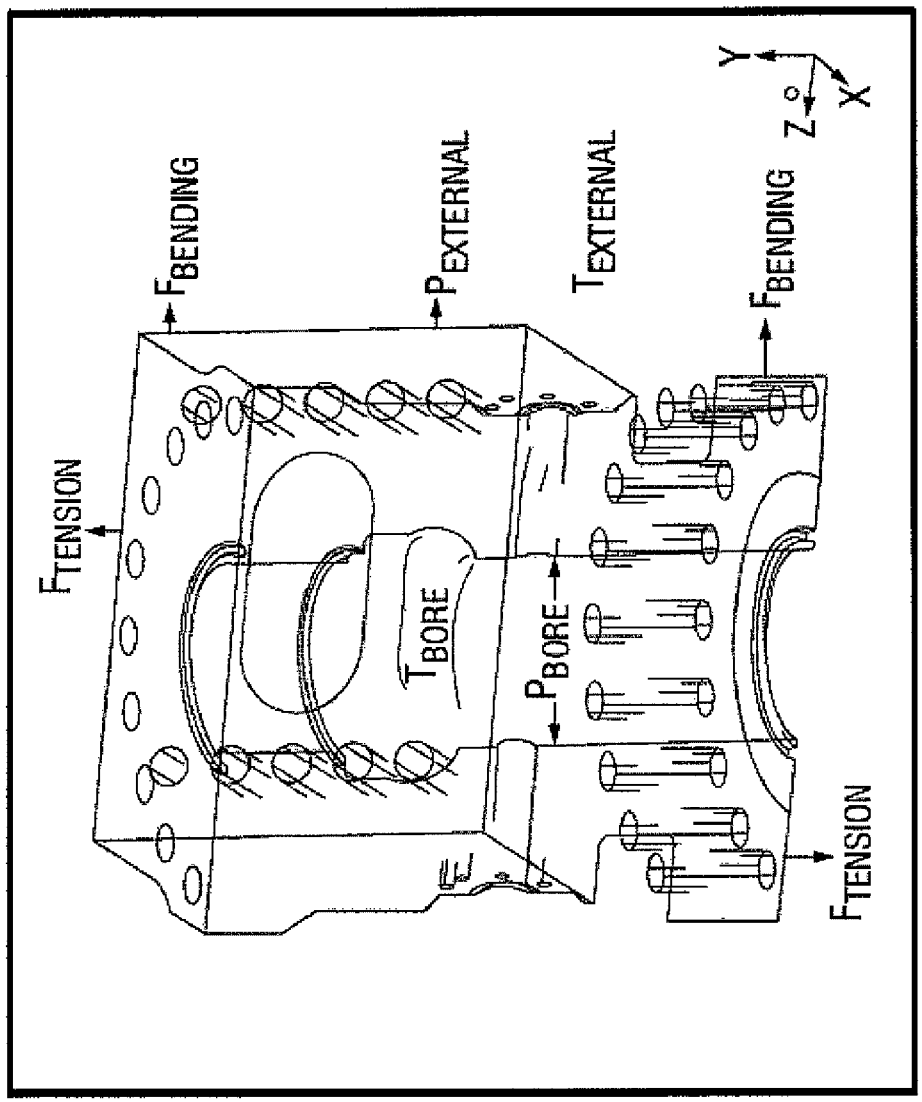
FIG. 1 illustrates a half-section overall model with applied loads and boundary conditions according to embodiments disclosed herein.

In one aspect, embodiments disclosed herein relate to a method of manufacturing or reinforcing oilfield components. In other aspects, embodiments disclosed herein relate to the heat treatment of oilfield components that have been selectively reinforced to reduce or eliminate stress and/or fatigue failures. In yet other aspects, embodiments disclosed herein relate to the selective heat treatment of the selectively reinforced areas of the oilfield components.

As used herein, "oilfield components" refer to flanges, bonnets, spools, stress joints, blowout preventers, sucker rods, subsea well assemblies, valves (e.g., choke valves), valve bodies, wellheads, and other equipment and parts commonly used for the drilling and production of oil and gas. Those skilled in the art will recognize that, although not specifically disclosed or described in detail, embodiments disclosed herein may apply to other oilfield components.

Component Design and Analysis

During pressure testing, transport, installation, and operation, oilfield components experience stress and strain based on fatigue loading conditions, many of which may occur on a continuous, semi-continuous, or cyclic basis. Loading conditions may include thermal loading, pressure loading, or mechanical loading. For example, thermal loading may occur when a wellbore is hot (e.g., 300° F.) and is located in 10,000 feet of water at 32° F. Pressure loading may result from internal (wellbore) pressure acting outward on the oilfield component or from hydrostatic (e.g., subsea) external pressure acting inward. Further, mechanical loading may include bonnet and flange bolt tightening preloads, axial tensile and compressive loads, and bending moments. As such, the loading conditions may include at least one of internal pressure, external pressure, axial tension, axial compression, longitudinal tension, longitudinal compression, axial bending moment, longitudinal bending moment, riser tension and bending, and temperature extremes, among other load states. The intensities of the local stress states placed on the equipment during these loading conditions may have a significant impact on the cyclic life of the equipment. Analyzing the performance of an oilfield component subject to various fatigue loading conditions may provide for enhancing the design and/or improving the performance of the oilfield components to extend the useful life of the oilfield component.

Finite element analysis ("FEA") is a useful and powerful technique for analyzing stresses and strains in structures or components too complex to analyze by strictly analytical methods. With FEA, the structure or component is broken down into many small pieces (a finite number of elements) of various types, sizes and shapes. The elements are assumed to have a simplified pattern of deformation (linear, quadratic, etc.) and are connected at "nodes" normally located at corners or edges of the elements. The elements are then assembled mathematically using basic rules of structural mechanics, i.e., equilibrium of forces and continuity of loads, resulting in a large system of simultaneous equations (a mesh).

By solving this large simultaneous equation system with the help of a computer, the deformed shape of the structure or component under load may be obtained, from which stresses and strains may be calculated. Suitable software to perform such FEA includes ABAQUS (available from ABAQUS, Inc.), MARC and PATRAN (available from MSC Software Corporation), and ANSYS (available from ANSYS, Inc.), among others. Finite elements of any shape known in the art may be used. Hexagonal elements, though, are typically highly stable and may be beneficial when simulating high stresses and strains across a model.

A simplified design and/or model of an oilfield component to assist in the analysis of the oilfield component may be used. For example, the analysis of stress and strain concentrations of complex component designs may be simplified by "smoothing" that design. As used herein, the term "smoothing" refers to various techniques to simplify a complex geometry of a design for use with FEA. For example, internal corners may be modified to reduce or eliminate their radii in an attempt to simplify a subsequently constructed model. These techniques may allow the analysis of a smoothed model (i.e., an FEA model constructed from a smoothed design) to correlate and converge to a definitive result when analysis of a non-smoothed model may not. As such, a model constructed from a smoothed design may be analyzed with FEA to determine an overall, or bulk, stress condition. By analyzing the bulk stress, the performance, and possible failure, of an oilfield component under various fatigue loading conditions may be predicted.

One objective of FEA may be to isolate high stress or strain areas and identify the areas that are prone to low cyclic life. The results of a finite element analysis, analyzing the performance of the component under various fatigue loading conditions, may be used to identify regions subject to fatigue failure in the oilfield component. Once the regions subject to fatigue failure are identified, these areas may be re-designed or may be marked for metallurgical processing, such as selective reinforcement, as will be described later.

Possible load states or fatigue loading conditions for the component should be determined for input into the FEA. As mentioned above, these may include normal operating pressure, high-pressure kick, riser tension and bending, and temperature extremes, among other load states. The fatigue loading condition data should include typical or expected values as well as maximum and/or minimum values and the frequency at which these loads fluctuate to enable a complete analysis.

Properties of the base material used to form the oilfield component should also be determined, establishing the maximum allowable peak stress value (SBpeak). The material properties may either be determined through empirical testing or, in the alternative, may be provided from commercially available material properties data. For example, this value may be established based on field tests where, under NACE environments (i.e., environments established by NACE International for testing of oil and gas field equipment), the stress would just meet the life cycle requirement and would be less than the stress at which sulfide stress corrosion cracking would occur.

More particularly, the tensile properties of the base materials may be determined. The tensile strength of a material is the maximum amount of stress (in tension) a material may be subjected to before failure. As stress is exerted upon a material, the material strains to accommodate the stress. Once the stress is too much for the material, it will no longer be able to strain, and the material fails. The failure point of the material is known as the ultimate tensile strength.

The loading conditions and material properties may then be used to analyze the oilfield component using FEA based methods. All permutations for design and operating loads should be considered to generate a complete analysis of the component. Proper bolt preloads and material characteristic data, de-rated based on temperature, should also be used.

A model (i.e., a mesh of simultaneous equations) for the oilfield component is generated for use in the finite element analyses. A three-dimensional model of the component may be generated with specific design features. These design features may be selected to give specific performance characteristics. Thus, generating a model may also include the steps of importing a component design to generate the model and smoothing the imported design. The design may have various smoothing techniques applied thereto to simplify FEA analysis. The models may be generated from a design in a computer aided design ("CAD") software package (e.g., AutoCAD available from Autodesk, Inc., and Pro/Engineer available from Parametric Technology Corporation) and imported into the FEA software package. Alternatively, the model may be generated within the FEA packages (e.g, ABAQUS and PATRAN) themselves.

Next, the loading conditions may be simulated upon the component in FEA using the model. Preferably, these simulated fatigue loading conditions reflect the load states or stress that the oilfield component may expect to experience under normal use. Further, after simulating fatigue loading conditions upon the model, a stress plot from the loading conditions showing the stress and deformation occurring in the oilfield component model may be analyzed. The stress plot may determine and show the location and amount of stress occurring in the oilfield component model from the simulated loading conditions across the component.

The stress plot may be analyzed and reviewed to determine the performance and characteristics of the model. If the model may be further improved, another model may be generated or the current model may be re-generated (modified). This will allow the model to be further simulated in FEA to determine its performance after further modifications or models. Otherwise, if the model is considered acceptable and meets any and/or all specified criteria, the model may be used in the manufacture oilfield components, as will be described below.

FEA Simulation Examples

Referring now to FIG. 1, an example including a three-dimensional model of a suitably designed 18¾ inch Ram BOP is shown. Based on ASME Section-VIII Div-3 criteria, the BOP model was designed either for high pressure high temperature (HPHT) or extreme high pressure and high temperature application (XHPHT) applications.

Before applying the proposed methodology described herein, such BOP body geometry was designed to satisfy all essential criteria for high pressure (above 15 ksi) and for high temperature (above 250° F.) applications. Based on ASME Section-VIII Division-3 criteria, the subject BOP was considered appropriately designed for structural loads with bore pressures up to 25 ksi and bore temperatures up to 350° F. The model and analyses of the model results may further facilitate any existing BOP design so that sulfide stress corrosion cracking, SSCC, or corrosion related limit conditions be met by selectively weld cladding of higher strength material suitable for use in a NACE environment.

For the subject XHPHT BOP, F22 material with a minimum material yield of 85 ksi was selected. Because necessary post-weld heat treatments (PWHT) would reduce the yield, 80 ksi may be considered to be the final minimum yield strength for the material. For SSCC or NACE environments, appropriate material tests were completed based on TM0177 Method A. Based on industry experience and available test data, it was observed that the specimens fail the TM0177 Method A test with 80% of yield stress level. Based on this, an upper value of 0.8*Minimum Yield Stress, or 64 ksi for F22 material, is considered acceptable.

The BOP was analyzed for three different maximum operating pressures, namely 15 ksi, 20 ksi, and 25 ksi bore pressures without a thermal load. The 20 ksi bore pressure case was also analyzed separately considering the thermal load at 350° F. alongside other loads as specified.

FIG. 1 shows typical loads and boundary conditions used in the analysis. As illustrated, the bore pressure was 24.45 ksi (a 20 ksi differential from external pressure), the bore temperature was 350° F., and the external temperature was 37° F. Finite element analysis (FEA) of the subject BOP was completed taking into account possible loading conditions. The loads include bore pressure, top tension and bending load, and pressure end loads.

Figure 2:
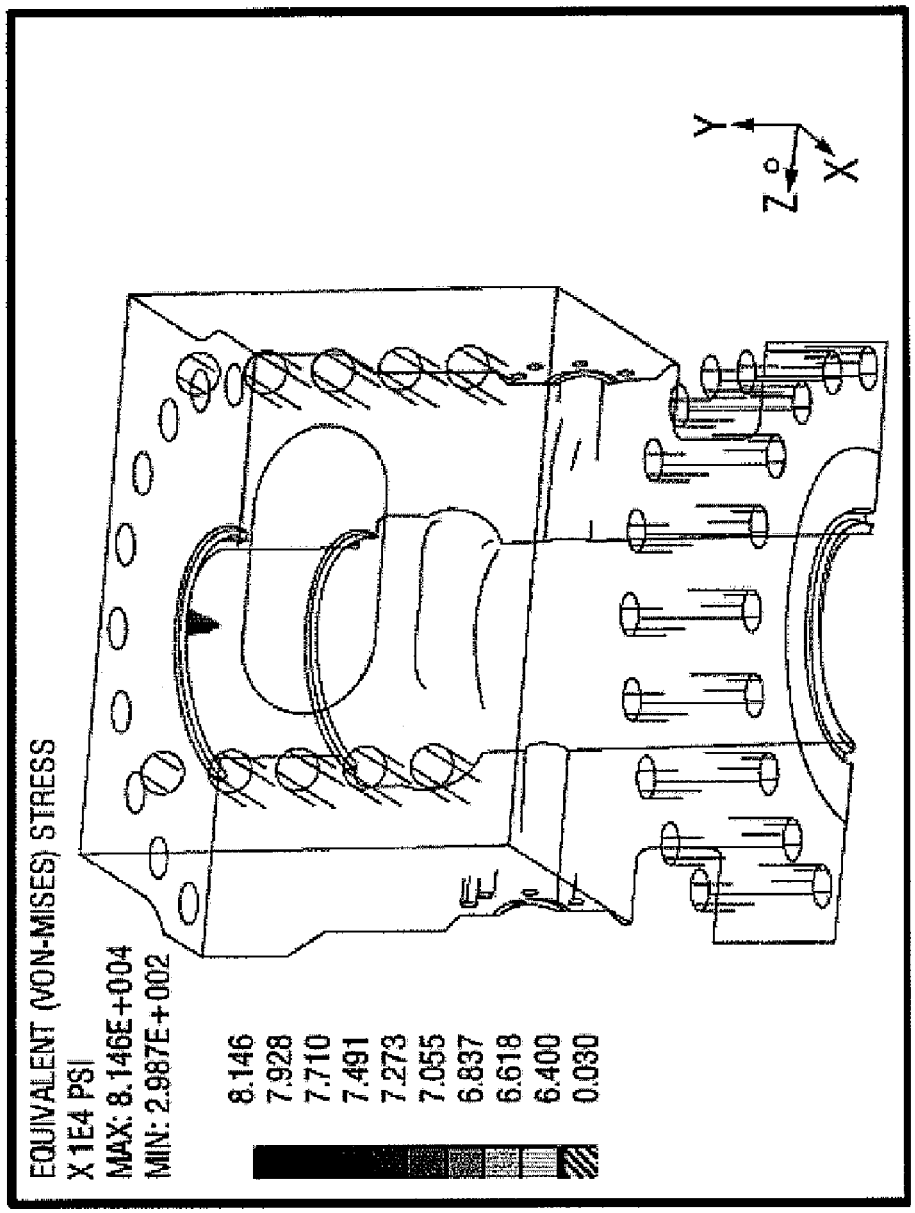
FIG. 2 shows the results of a finite element analysis of the model of FIG. 1 subject to a pressure of 15 ksi in accordance with embodiments disclosed herein.
Figure 3:
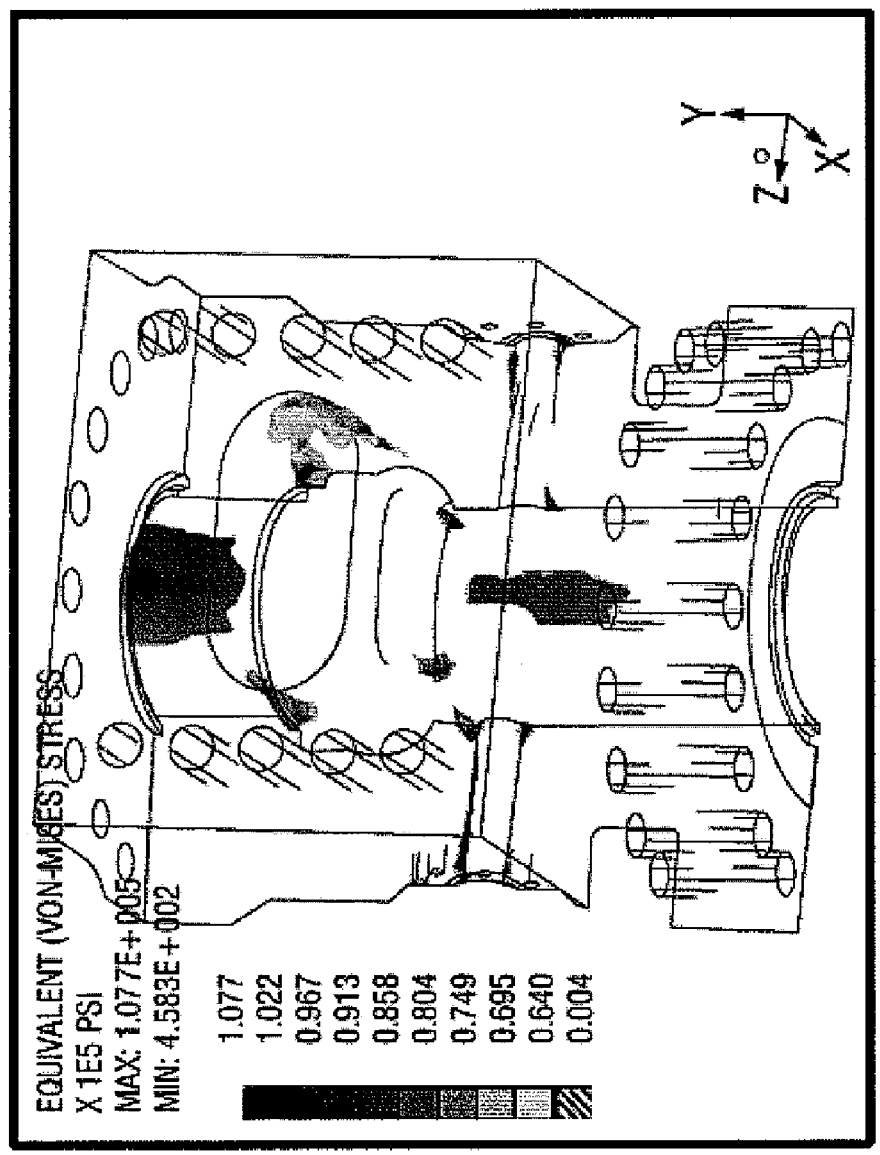
FIG. 3 shows the results of a finite element analysis of the model of FIG. 1 subject to a pressure of 20 ksi in accordance with embodiments disclosed herein.
Figure 4:
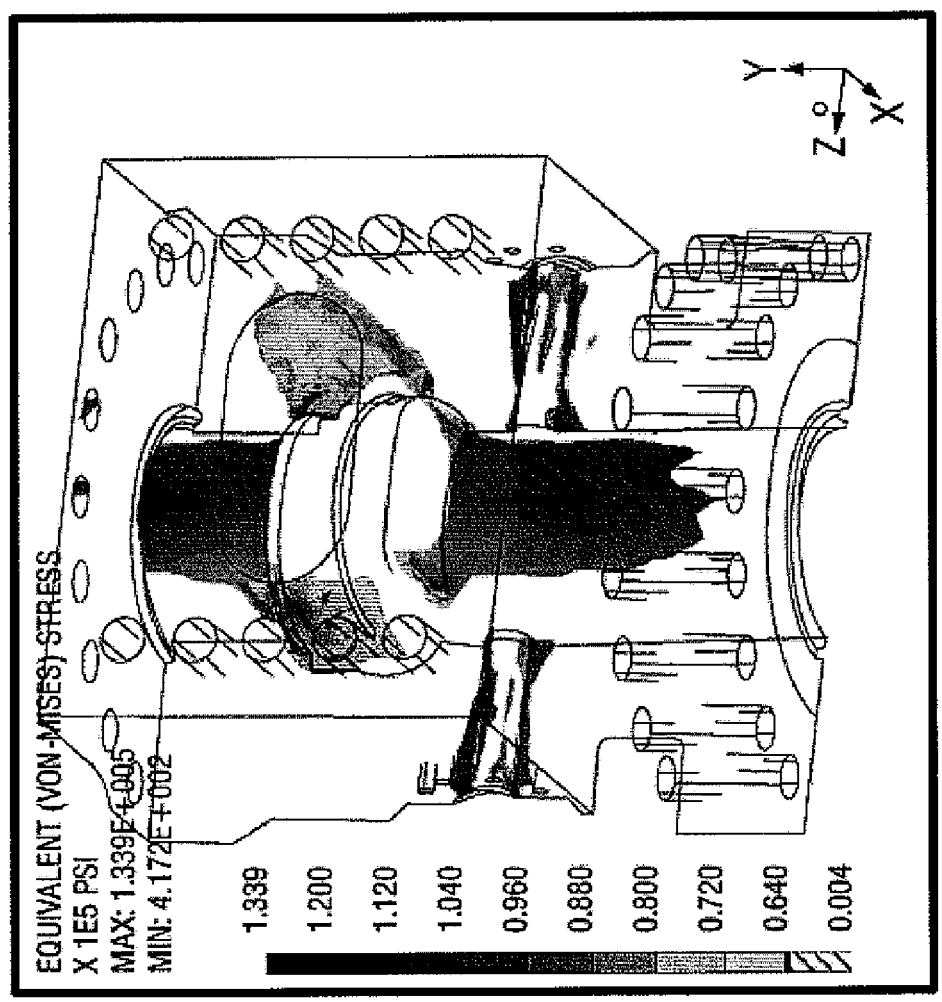
FIG. 4 shows the results of a finite element analysis of the model of FIG. 1 subject to a pressure of 25 ksi in accordance with embodiments disclosed herein.

The results of the finite element analyses are shown in FIGS. 2-5 as von misses stress, VMS, plots. For the VMS plots, FIGS. 2-5, a lower bound stress of 64 ksi was used to isolate all higher stress areas. Only stress zones above 64 ksi are shown in all these figures. FIG. 2 shows stresses on the half-section overall model for the 15 ksi bore pressure case (with no thermal stress). A similar plot for 20 ksi bore pressure (with no thermal stress) is shown in FIG. 3. FIG. 4 shows VMS stresses for 25 ksi bore pressure (with no thermal stress).

Figure 5:
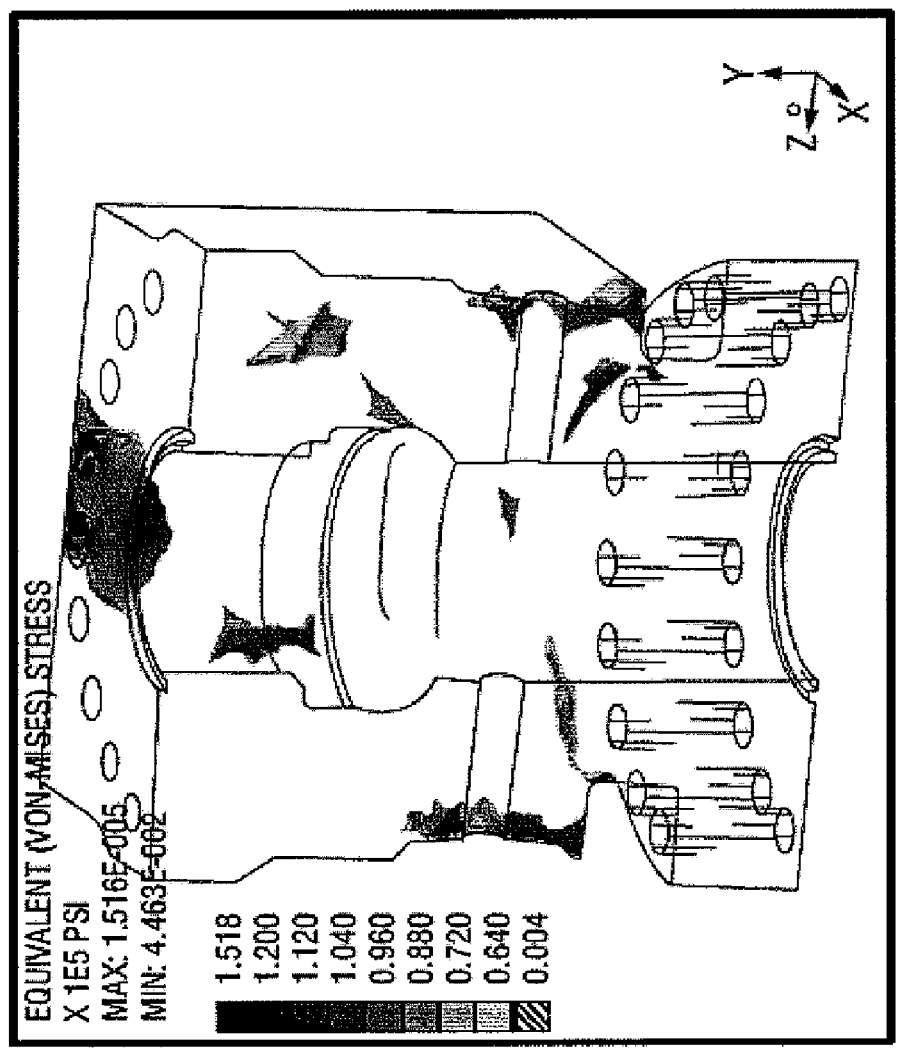
FIG. 5 shows the results of a finite element analysis of the model of FIG. 1 subject to a pressure of 20 ksi and an internal temperature of 350° F. in accordance with embodiments disclosed herein.

FIG. 5 shows VMS stresses for 20 ksi bore pressure with a 350° F. thermal load considered simultaneously as the bore surface temperature. Convective heat transfer coefficients $h_f$, computed via separate CFD analysis, were applied in the sea water exposed areas.

The results of the FEA analyses indicated that the highest stresses occur in the bore side of the BOP where no thermal loads are applied. Applied thermal stresses, being compressive, decreased the inside stress level significantly, however, the external stresses increased. The external stress areas were considered of minimal consequence to SSCC (or NACE related) constraints. The models indicate that the thermal stress state is a non-conservative issue for the high pressure (HPHT) application, particularly relating to compliance with NACE material requirements.

Next, it was observed that the subject BOP is suitable for NACE application for 15 ksi bore pressure. Except for a few localized spots, where VMS stress is above 64 ksi, the entire BOP stack is appropriately suitable for NACE environment. Minor modification to the model, refined meshing, may eliminate such very small location of high stress (above 64 ksi).

The VMS stress zones above 64 ksi are clearly visible in the results for the 20 ksi and 25 ksi bore pressures, as shown in FIGS. 3 and 4, respectively. These stress plots identify locations and depths of high VMS stress areas above 64 ksi. The highest stress remains below 108 ksi for the 20 ksi bore pressure FEA and below 112 ksi for the 25 ksi bore pressure FEA. A small zone with stress exceeding 112 ksi was observed around the groove area at the top of the BOP. Analysis with a complete assembly indicates that stiffness of the top mating flange and contact stresses from bolt preload would reduce such peak stress. Maximum VMS stress of 120 ksi would remain to be appropriate for 25 ksi bore pressure application.

The depth of the high stress zones indicated by the VMS stress plots can be calculated. NACE compatible material, such as Inconel 725, with 120 ksi minimum yield strength, can have a 90% yield strength of 108 ksi (0.9*120=108) and satisfy the TM0177 Method A test. Therefore, the base material in these zones may be selectively clad with a higher strength corrosion resistant alloy which has been qualified to meet the requirements of NACE MR0175/ISO 15156.

The FEA results additionally show that the localized stresses of the material occur within 0.250 to 0.500 inches of the ID surface of the ram BOP body at or near the 18¾ inch through bore. It may be possible to clad overlay the affected high stress areas with a higher strength material that is qualified to NACE MR0175.

The clad overlay thickness may not need to exceed 0.375 inches to encapsulate the localized stress that may approach 75,000 psi. A clad overlay thickness with a minimum yield strength of 120,000 psi, thick enough to encapsulate the localized stress, may be capable of keeping the localized stress below two thirds of the minimum yield strength of the clad layer required by the base metal. This overlay of higher strength material may be accomplished by a number of different methods as described above.

Selective Reinforcement

Objectives of the numerical methods (e.g., FEA analysis), as described above, include identifying, isolating, and highlighting zones subject to fatigue failure within the oilfield components. For example, the stress states which may cause early failure under NACE environment may be identified, The results of the FEA may be used to generate stress and strain plots for identifying regions subject to fatigue failure in the component.

These plots, such as those shown in FIGS. 2-5, for example, may be used to isolate areas where stresses exceed 90% of base material yield strength. Areas in excess of 90% yield are particularly noted due to the performance and testing requirements imposed upon oil and gas field equipment. For example, for corrosive (NACE) environments, the design code may limit maximum strain to 90% of material yield so that design life cycle may be maintained. Areas where stresses may exceed 90% of base material yield include seat pockets, the BOP pocket near the bonnet, and BOP inner bores (vertical bores, horizontal bores, and the intersections of the vertical and horizontal bores). The results may also be used to calculate the depth of the high stress zones in excess of 90% yield.

The identified zones subject to fatigue failure may be modified in the manufacture of the oilfield component. For example, the zones may be marked out, in a spatial representation or drawing, noting the depth and lateral extents (length and width) of high stress areas subject to fatigue failure. A contour plot may be drawn, showing the length, width, and depth of the local stress areas. The surface location of the fatigue zones, for example, may be transferred to appropriate manufacturer's drawings. The identified fatigue zones may then be selectively reinforced with a higher strength material bonding metallurgically with the base material.

It may be possible, in some embodiments, to reduce or help prevent fatigue failure by surface substitution methods. For example, if some depth of the part base metal of low-alloy steel is removed and replaced with a higher strength material and a metallurgical bond with the base metal is developed, fatigue failures may be reduced or eliminated. The higher strength alloy may be any convenient alloy of the user's choosing that exhibits the strength, ductility, and corrosion resistance required by the design of the oilfield components or parts.

The higher strength material may include other low-alloy or medium-alloy steels with higher strength and/or higher corrosion resistance than the low-alloy steel base metal and would be capable of withstanding the applied stresses with a lower ratio of applied stress to yield strength. Lowering the ratio of applied stress to yield strength of the higher strength material would reduce its tendency to initiate fatigue cracking, fatigue crack propagation and ultimate fatigue failure. For example, a high strength alloy such as Alloy 625 may be used to replace and bond with the low-alloy base metal. The choice of the cladding alloy that could be substituted for the partial thickness of the base metal substrate up to 0.500 inches or more would be made on the basis of the ratio of the applied stress to the yield strength of the alloy used for the clad layer.

In some embodiments, the base material may be selectively reinforced with an inlay clad. In other embodiments, the base material may be selectively reinforced with an overlay clad. The clad inlay or overlay may be bonded to the base material using pressure, heat, welding, brazing, roll bonding, explosive bonding, weld overlaying, wallpapering, or a combination thereof. In some embodiments, the cladding may be bonded to the base material using an electric arc welding process, such as a submerged arc welding ("SAW") process or a tungsten inert gas ("TIG") welding process. In other embodiments, the cladding may be bonded to the base material using an electric arc weld cladding process, a hot isostatic pressing cladding process ("HIP" cladding), auto-frettage cladding, laser cladding, or a combination of any of these methods. In some embodiments, one or more clad layers may be used, such as a single clad having two layers (base plus clad), a double clad (having 3 layers), or a cladding of up to 7 or more layers.

In some embodiments, the base material may be selectively reinforced with a clad inlay. The clad inlay, in various embodiments, may be shrunk-fit or press fit into recesses cut in the body of the oilfield component, and seam/seal welded in place. In other embodiments, the clad inlay may be shaped according to the FEA stress plots.

The clad inlay or overlay, in some embodiments, may have a thickness or an average thickness of up to 0.625 inches or higher; up to 0.75 inches or higher in other embodiments; and up to 1.0 inches or higher in yet other embodiments. In other embodiments, the clad inlay may have an average thickness in the range from about 0.010 inches to about 0.75 inches; from about 0.050 to about 0.625 inches in other embodiments; and from about 0.125 to about 0.5 inches in yet other embodiments.

In other embodiments, press-fit or shrink-fit component parts manufactured of the high-strength alloy may be used in conjunction with the oilfield components. For example, solid parts (e.g., flanges, bonnets, valve bodies, etc.) made of a high-strength alloy (e.g., INCONEL 725) may be seal welded to a low-strength substrate after being pressed or shrunk-fit into a body.

In other embodiments, the base metals in the identified fatigue zones may be replaced with a higher strength material bonding metallurgically to the base material. For example, the base metals in the high stress areas may be ground or machined away and replaced with a higher strength material bonding metallurgically to the base material.

In some embodiments, the selective reinforcement is a clad overlay of higher strength material over a base material. In other embodiments, the selective reinforcement may be a clad overlay of higher strength material in ground or machined recesses in a base material.

The choice of the cladding alloy may be based on its ability to resist corrosion, including stress corrosion cracking, and its ability to add mechanical strength (e.g., by a metallurgical bond to the low-alloy substrate) to the portion of the oilfield component to which it is applied and intended to protect. In a typical overlay, for example, the strength of the cladding material is expected to at least equal the strength of the base metal to which it is applied. That is, the weld deposited alloy (such as Alloy 625) is expected to match the yield strength of the low-alloy steel base metal (such as low-alloy steel having a yield strength of 75,000 psi). It may be possible to apply a cladding of a higher strength material in a thickness that will encapsulate the localized stresses in the higher strength clad layer, resulting in an oilfield component that will meet NACE or other standards for oil and gas field components and equipment while meeting the strength and fatigue requirements of the design. For example, embodiments of selectively reinforced ram BOP bodies disclosed herein may be manufactured to operate under high pressure and high temperature conditions (e.g., at 20,000 psi maximum internal pressure and higher design operating pressures or where very high localized stresses are found).

In some embodiments, the base material may be F22 low-alloy steel, a steel having approximately 2 weight percent chromium and 1 weight percent molybdenum. Alternatively, the base material may be 4130 or 8630 modified low-alloy steel. Those skilled in the art will recognize that other materials, having appropriate corrosion resistance, hardness, and tensile properties suitable for use in an oil and gas environment, may also be used as a base material.

In some embodiments, the clad overlay or clad inlay may be formed from high yield strength, precipitation-hardenable corrosion resistant alloys, such as INCONEL 725, or INCONEL 725 NDUR, for example. In other embodiments, the clad overlay or clad inlay may be formed from high yield strength, precipitation-hardenable corrosion-resistant alloys such as Alloy 718 or INCONEL718 SPF. In still other embodiments, the clad overlay or clad inlay may be formed from other precipitation-hardenable corrosion-resistant alloys such as 17-4PH, INCONEL 625 or INCOLOY 925. Those skilled in the art will recognize that other high strength corrosion resistant materials may also be used as a cladding. Preferably, the cladding material is compatible with the base material and is a precipitation-hardenable alloy.

The alloys for use as a cladding may be available in the form of weld wire, powder, or strip filler metal for weld cladding and may also be available in the form of a powder intended to be used in a HIP cladding operation. These alloys may also be available in other forms that may be used in an auto-frettage cladding operation.

Once the cladding method or combination of cladding methods has been chosen, the minimum thickness and locations of the clad layer may be determined based on the results of the FEA stress analysis. The required thickness or depth of the cladding may vary depending upon the alloy used in forming the cladding, the bond formed between the clad and the base materials, as well as the dilution of the clad material resulting from the process used to bond the clad material to the base material. Once the values and location of the areas subject to fatigue failure have been determined, the cladding alloy may be chosen. It may not be necessary to clad the entire oilfield component. Particularly, only portions of the component may need to be clad. For example, only portions of the BOP body, including the wetted surfaces, the ram cavities, and the choke and kill side outlets of the ram BOP body, may need to be clad. Furthermore, it may be possible to selectively place a much lower clad thickness in lower stressed areas, thus preventing corrosion of those areas subject to contact with the wellbore fluid.

Figure 6:
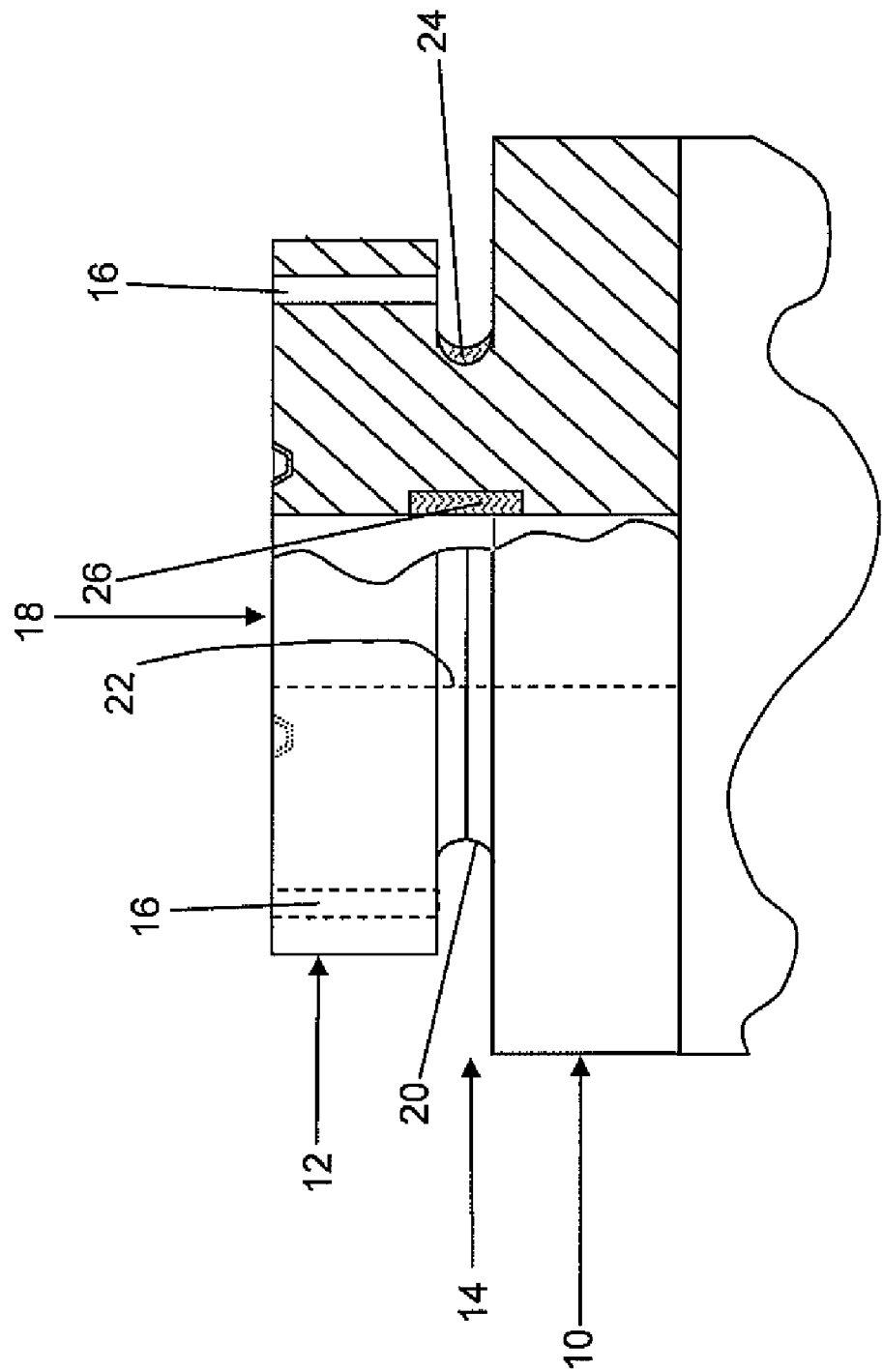
FIG. 6 is section view drawing of a flange neck reinforced in accordance with embodiments disclosed herein.

As one example, referring now to FIG. 6, a schematic drawing of a flange neck reinforced for fatigue control is illustrated. A vessel body 10 is attached to an integral flange 12 by flange neck 14. Flange neck 14 may experience fatigue loading conditions due to the movement of components attached to flange 12, due to the tensioning of the bolts in bolt holes 16, internal pressure pushing outward on the vessel body 10 due to a fluid in bore 18, and other loading conditions. The outer diameter surface 20 of flange neck 14 and the inner diameter surface 22 of vessel 10 across the wall thickness from the flange neck 14 are commonly subjected to high fatigue loading conditions, and may be selectively reinforced using clad inlays or clad overlays 24, 26, by the methods described above. For example, a flange neck subjected to fatigue loading conditions is the bottom flange on ram and annular blowout preventer bodies used in a subsea wellhead assembly stack. These ram and annular blowout preventer bodies in the stack are subject to considerable cyclic bending loads which result in a severe bending fatigue situation on the flange necks. Selective reinforcement may additionally provide greater resistance to stress corrosion cracking to these areas that are subject to fatigue loading conditions.

As another example, drilling or production riser stress joints may be selectively reinforced to reduce or eliminate fatigue failures. This stress joint has in the past been manufactured from a high strength titanium alloy which is capable of withstanding much more bending deflection than a low-alloy steel because of the much lower modulus of the titanium alloy compared to the low-alloy steel. However, titanium components are very expensive and are not characterized by "fatigue strength." While steel components exhibit a fatigue strength, under which a component will not fail, regardless of the number of cycles, titanium components will eventually fail regardless of the magnitude of the cyclic loading. Therefore, by selectively reinforcing a low-alloy steel, it may be possible to manufacture a stress joint capable of withstanding the bending and deflection associated with the stress joint for longer times (i.e., more cycles) using a lower cost material.

As another example, sucker rods and other components of rod pumps subject to high cyclic axial fatigue may be selectively reinforced to reduce or eliminate fatigue failures. The use of a high strength surface layer on the OD surface of sucker rods, for example, may prolong the service life of these parts as well. Moreover, a high strength corrosion resistant material would likely reduce the effects of any corrosion fatigue induced from the environment in which they are used.

As another example, valve bodies may be selectively reinforced to reduce or eliminate fatigue failures, to reduce or eliminate corrosion, and/or to be manufactured more economically. In the case of certain valves (e.g., choke valves), the selective reinforcing may also reduce or eliminate erosion caused by the high velocity flows on the downstream (i.e., the low-pressure) side of the choke valve.

As another example, blowout preventer bodies, in addition to the flange necks, may also be subject to fatigue and may be selectively reinforced to reduce or eliminate fatigue failures. As described above, blowout preventers are installed to limit the equipment that may be affected by a high pressure kick. There are several types of blowout preventers, the most common of which are ram blowout preventers and annular blowout preventers (including spherical blowout preventers). Ram blowout preventers, for instance, are currently manufactured in various bore size ranges, and may have a working pressure range from 2,000 to 15,000 psi. However, it may be desired to use ram blowout preventers at higher pressure and higher temperature conditions (above 15,000 psi and greater than 250° F.). Particularly, ram blowout preventers rated at working pressures of 20,000 psi, 25,000 psi, and higher and working temperatures of up to 350° F. or higher, may be desired. For example, see U.S. patent application Ser. No. 11/528,873 titled "Reinforcement of Irregular Pressure Vessels" by Huff and Khandoker, filed on Sep. 28, 2006, hereby incorporated by reference in its entirety. Results of the above described FEA for blowout preventers used under high temperature and/or high pressure conditions indicate that selective reinforcement of various sections of the blowout preventer, such as the choke and kill pockets, may enable the blowout preventer to be used at the higher temperatures and pressures.

The objectives of the above described numerical methods (FEA analysis) include identifying, isolating, and highlighting zones of high or peak stress (SBpeak) states within the BOP equipment. For example, the stress states which may cause early failure under NACE environment may be identified. The results of the BOP FEA may be used to generate stress and strain plots for identifying regions of high stress concentrations in the vessel.

In addition, stress and strain plots may be used to define a critical section thickness ("CST") in a casting or forging used in an oilfield component in order to accurately determine the appropriate heat treatment time at a selected temperature. Critical Section Thickness is defined as the largest thickness of a component which must have certain minimum mechanical properties through the entire thickness. For example, a lightly stressed, thick walled portion of a pressure vessel or BOP may not require 80,000 psi yield strength through its entire thickness, but a thinner portion may require 80,000 psi yield strength through the entire thickness in that portion; in this example, the thinner portion may have the CST. A total heat treatment time may comprise a first time (expressed in minutes per inch of CST) and a second time (expressed in hours) which are summed together. For the purpose of this disclosure, the first time is called the "dwell" time and the second time is called the "soak" time. For example, a typical conventional heat treatment time may include 30 minutes per inch of CST dwell time and one hour soak time. In this example, a forging used in an oilfield component with a CST of 10 inches would require 6 hours heat treatment time at a selected temperature (i. e., 10 inches×30 minutes per inch dwell time plus 1 hour soak time).

Furthermore, stress and strain plots may be used to isolate areas where stresses exceed a selected percentage of base material yield strength. For example, in particular alloys used as a base material, areas in excess of 80% yield may not pass NACE requirements (as discussed below), or may not provide an adequate engineering safety factor in a particular application, for example, operation at a particular combination of internal pressure and temperature. For example, areas in a BOP where stresses may exceed a selected percentage of base material yield strength include seat pockets, the BOP pocket near the bonnet, and BOP inner bores (vertical bores, horizontal bores, and the intersections of the vertical and horizontal bores). These stress and strain plots may also be used to calculate the depth of the high stress zones in excess of a selected percentage of base material yield strength.

The identified high stress zones may be modified in the manufacture of a BOP. For example, the zones may be marked out, in a spatial representation or drawing, noting the depth and lateral extents (length and width) of high stress areas exceeding the allowable SBpeak stress. A contour plot may be drawn, showing the length, width and depth of the local stress areas in excess of a selected percentage of the base material yield strength. The surface location of the peak stress zones, for example, may be transferred to appropriate manufacturer's drawings. The identified high stress zones may then be selectively reinforced with a higher strength material. In some embodiments, this higher strength reinforcing material may be metallurgically bonded with the base material.

Hardening

Selectively reinforced oilfield components, including flange necks, blowout preventers, sucker rods, and other components, particularly those exposed to corrosive fluids, may need to meet the design criteria for metallic oil and gas field components, such as those requirements established by NACE International (formerly the National Association of Corrosion Engineers) and the European Federation of Corrosion for the performance of metals when exposed to various environmental compositions, pH, temperatures, and $H_2S$ partial pressures (including NACE MR0175, NACE TM0177, and NACE TM0284). For example, NACE MR0175 limits the maximum hardness of the parts to Rockwell C 22 or Brinell 237 for low-alloy steels in the quenched and tempered condition. These hardness limitations must be met in addition to developing the desired yield strength for the selectively reinforced areas.

However, meeting the hardness limitation while developing the desired yield strength may require changes to the current manufacturing techniques. Post-weld heat treatment temperatures and times may be in conflict with the age hardening temperatures and times. For example, where a low-alloy steel base material is selectively reinforced with a nickel-based corrosion resistant alloy (CRA), the post-weld heat treatment temperature may be sufficient to obtain the required maximum hardness value for the heat affected zone during welding of the clad overlay, but the PWHT temperature may be too low to obtain the required mechanical properties in the age-hardenable CRA overlay material.

To overcome these competing temperature and time requirements, a method of manufacturing the selectively reinforced oilfield components has been developed to procure the desired properties in the base material and the material used to selectively reinforce the base material. In one such method, a casting, forging, or hot isostatic pressing used in an oilfield component may be made from a base material including, but not limited to, low-alloy steel. Appropriate low-alloy steels may include, but are not limited to, 4130, 8630 Modified, and F22.

The base material may then be normalized. For example, an F22 low-alloy steel forging may be normalized at 1750° F. for 30 minutes per inch of thickness plus one hour. If desired, the castings, forgings, or hot isostatic pressings may then also be rough machined into a desired configuration.

Following normalization, the castings, forgings, or hot isostatic pressings may then be quenched and snap-tempered ("Q&ST") to prevent cracking. As used herein, "snap tempering" describes an intermediate low temperature heat treatment that softens the alloy slightly and decreases the likelihood of cracking, especially so-called "autogenous" or "self" cracking. For example, a component made from F22 may be Q&ST to 900-1000° F. for a dwell time of about 30 minutes per hour per inch of CST, plus a soak time of one hour. Optionally, the rough machining described above may be performed after the snap tempering. As-forged, as-cast, and as-pressed components may be especially delicate and snap tempering after quench may allow them to be handled, shipped, and/or further machined without cracking.

Ordinarily, in conventional practice, castings, forgings, and pressings used in oilfield components would be fully heat-treated by processes including normalizing, austenitizing, solution annealing, tempering, age-hardening, heat treating, and other methods as known in the art to achieve the desired final material properties before they are inlaid or overlaid with CRA material. For example, according to conventional practice, a BOP body made from a low-alloy steel such as, for example, 4130, 8630, or F22, would be fully heat treated and at least partially machined before it was weld-inlaid with a CRA material such as INCONEL 625 in, for example, the ring gasket grooves on its flanged connections. In conventional practice, such an inlaid BOP body would then be stress-relieved (that is, annealed) to some temperature below the tempering temperature of the base material to ensure that the yield strength of the base material is preserved.

According to the current disclosure, the castings, forgings, and pressings used in oilfield equipment, having undergone Q&ST, may be finish-machined and selectively reinforced (as described above) with a clad material without fully tempering the castings, forgings, or pressings. Once selectively reinforced, the clad material may be finish-machined (if necessary) to obtain their final geometry. Furthermore, following selective reinforcement, the oilfield component may then undergo a single heat treating step, referred to herein as a "finish temper," for a selected period of time at a selected temperature. In one embodiment, the selected period of time is intermediate a time required to completely temper the base material and a time required to age-harden the clad material. Furthermore, the selected finish temper may provide for one or more of (a) developing the required mechanical properties of the base material, (b) post-weld heat treatment of a heat affected zone of a welded joint between the base material and the clad material, and (c) age hardening (also known as "precipitation hardening") the clad material.

In another embodiment, the clad material may be further strengthened by a "supplemental heat treatment" after the finish tempering by the selective application of heat. For example, ceramic electric heating blankets well known in the art may be used to "supplementally age" the clad material. In an exemplary embodiment of supplemental aging of the clad material, heat is applied to the surface of the clad material with ceramic electric heating blankets so that a temperature gradient is developed across the cladding material and the base material, such that the temperature of the base material is always less than the finish tempering temperature (or, in particular, less than the finish tempering temperature minus about 50-100° F.).

In another embodiment, age-hardenable clad material may be applied as selective reinforcement to a conventionally quenched and final-tempered oilfield component (as discussed below), then the cladding may be "supplementally aged" as above without affecting the "final" temper.

In some embodiments, the finish-temper process is facilitated by a nexus between the tempering temperature of the base material and the age-hardening temperature of the clad material. In some embodiments, the base material may have a tempering temperature within 100° F. of an aging temperature of the clad material. In other embodiments, there may be as few as 75° F. or 50° F. separating the two temperatures.

Thus, in some embodiments, the time required by both the desired tempering cycle and the desired age-hardening cycle are such that they may coincide at a total finish temper time (dwell time plus soak time), achieving the properties required of both the base material and the clad material. In other embodiments, the time required by both the tempering cycle and the age hardening cycle are such that a total finish temper time intermediate a desired tempering time and a desired age-hardening time may achieve the properties required of both the base material and the clad material.

The finish temper, as mentioned above, may result in the desired properties for both the base material and the clad material. In some embodiments, the finish temper may result in the base material developing a yield strength of between 80 ksi and 95 ksi. In other embodiments, the finish temper may result in the clad material developing a yield strength of at least 115 ksi. In yet other embodiments, the finish temper may result in an oilfield component with a base material having a maximum hardness of HRC 22 or Brinell 237. In selected embodiments, these properties are met for each component.

In some embodiments, the finish temper temperature may be between about 1200° F. to about 1300° F.; between about 1225° F. and 1300° F. in other embodiments; and between 1215° F. and 1225° F. in yet other embodiments. In some embodiments, the finish temper temperature may be greater than a post-weld heat treatment temperature of the base material.

In some embodiments, the finish temper time of the selectively reinforced oilfield component may be 30 to 60 minutes per inch of CST "dwell" time plus one to two hours "soak" time. In other embodiments, the finish temper time for the selectively reinforced component may be 30 to 45 minutes per inch of CST "dwell" time plus one to two hours "soak" time. In still other embodiments, the finish temper time may be 38 to 42 minutes per inch of CST "dwell" time plus about one hour "soak" time.

As described above, embodiments disclosed herein may provide a method for manufacturing a selectively reinforced oilfield component. The oilfield component may include a base material selectively reinforced with a clad material, and the method may include finish tempering the oilfield component at a selected time and temperature to temper the base material and age harden the clad material.

Referring now to FIG. 7, a block diagram of a process for manufacturing a selectively reinforced oilfield component in accordance with embodiments disclosed herein is illustrated. Manufacturing process 50 may include step 52, providing a base material for an oilfield component. As one of ordinary skill in the art should understand, providing 52 may include, but is not limited to, forging or casting, hot isostatic pressing, rough machining of the base material, and normalizing the base material. Next, manufacturing process 50 may include quenching and snap tempering (Q&ST) 56 of the treated base material. Following snap tempering 56, the base material may be selectively reinforced 58 with a clad material. Selective reinforcing 58 may include, for example, inlaying the base material with a corrosion resistant alloy, where the corrosion resistant alloy may have a higher strength than the base material. After selectively reinforcing 58, the oilfield component (i.e., the base material and the clad material) may undergo finish temper 60. Finish temper 60 may include finish tempering the oilfield component at a selected time and temperature to temper the base material and age harden the clad material.

Finish Temper

The prior art manufacturing process described above may be modified in accordance with the present disclosure as follows. The ram BOP body may be forged and rough machined in the same manner as is presently done, however the heat treatment of the rough machined BOP body would be modified. The body would still be normalized and austenitized at the appropriate temperatures and liquid quenched as is the present practice. After the completion of the liquid quench, the temper would be modified to a much lower value, and a "snap" or intermediate low temperature temper would be performed. As previously discussed, one purpose of the snap temper is to prevent spontaneous or "autogenous" cracking of the as quenched low-alloy steel material during processing until the time of the final temper.

Upon receipt of the rough machined and snap-temper heat treated forging, the BOP body may be prepared for weld overlay. The BOP body may then be overlay welded to selectively reinforce those areas determined by the stress analysis described above, which may be transferred to the engineering drawing. After all welding has been completed, the BOP body may be charged to the tempering furnace for finish tempering, a combination heat treatment of the weldment joint of the overlay clad material on the low-alloy steel substrate.

The finish temper would consist of a temper for the base metal to develop the mechanical properties required of the base metal by the material specification. The temper would also provide for the PWHT of the HAZ of the weldment joint since the tempering/aging temperature would be above the PWHT temperature normally used for the base material/CRA weldment joint. And lastly the temper would serve as the age hardening heat treatment for the high strength CRA overlay filler metal.

This finish temper process is possible since the tempering temperature of the base metal and the aging temperature of the CRA overlay material may be nearly identical, such as when the base material and CRA overlay are properly selected and processed. The time required by both the tempering cycle and the age hardening cycle are such that they may be averaged and achieve the properties required of both materials.

The mechanical properties of the alloy may be determined by use of a separate qualification test coupon, QTC, which may be heat treated separately from the part itself provided that it is heat treated according to specific rules mandated by API for parts to be used in the oil exploration and production industry. For example, to verify that the BOP body conforms to the material property requirements, two qualification test coupons, QTCs, may be produced from the same heat of steel from which the BOP body is produced. The two qualification test coupons, QTCs, from the same heat of the low-alloy steel from which the body was forged, may be normalized, austenitized, liquid quenched and tempered either simultaneously with or separately from the body forging using the same cycle temperatures and times. One of the QTCs may be tempered at a temperature and time necessary to develop the mechanical properties required by the material specification. The remaining QTC may be finish tempered along with the selectively reinforced BOP. These QTCs may then be sent to a mechanical testing laboratory for mechanical testing of the mechanical properties to ensure that the base material and the clad material meet the specified requirements.

Finish tempering the BOP body in this manner may allow the base material and the clad material to meet the desired properties, including yield strength, hardness, and/or the requirements of NACE for resistance to stress corrosion cracking. Moreover, the CRA inlays should be more resistant to and help reduce axial or bending fatigue failures.

For example, Grade F22 forgings or castings may be produced and machined in the manner is which they have normally been produced, as described above. However, the heat treatment may be modified. The normalizing and austenitizing temperature cycles and times along with the liquid quench may remain unchanged. The tempering temperature may be changed to between 900° F. (482° C.) and 1100° F. (593° C.) and the time at temperature may be reduced or remain unchanged. The forged BOP body may then be selectively reinforced with INCONEL 725 or another age hardenable alloy or CRA.

Once the welding operations are complete, the selectively reinforced BOP body may be charged to a heat treating furnace to perform a finish temper that may be a combination temper, aging, and PWHT, to stress relief anneal the HAZ of the Grade F22 base metal and age harden the INCONEL 725 CRA weld metal inlay and develop the mechanical properties of the Grade F22 forging. Other age hardenable alloys and/or CRAs, such as, INCONEL 718 SPF (Alloy 718), may also be used as the filler metal for this application. The temperature and time of the finish temper (combination temper/PWHT/age hardening heat treatment) step may be determined by the weld procedure qualification record ("PQR") and documented on the weld procedure specification ("WPS"). After the finish temper has been completed, a similarly processed QTC may be delivered to a metallurgical testing laboratory for the determination of the mechanical properties of the material and whether they meet the requirements of the material specification.

Since the PWHT and the tempering cycle may be performed simultaneously with the age hardening of the clad inlay metal, there will not be any loss of mechanical properties of the base metal as may occur where a separate PWHT is performed after the temper of the low-alloy steel base metal.

In one embodiment, a ram BOP body forging is produced from F22 alloy. The raw forging is normalized at 1750° F. for 30 minutes per inch of CST "dwell" time, plus one hour "soak" time. It is then water quenched and snap-tempered at 900° F. for 30 minutes per inch of CST, plus one hour.

Optionally, the quenched and snap-tempered ram BOP body is then rough machined, for example with "weld necks" to facilitate welding flanges to the BOP body. Optionally, various appurtenances such as flange connection or fixtures are then welded to the Q&ST body; these appurtenances may preferably also be comprised of Q&ST F22 alloy. The Q&ST body is then finished-machined and inlaid with INCONEL 725 in areas requiring selective reinforcement and/or improved corrosion resistance. Optionally, the inlaid areas are further machined. Finally, the finish-machined body with inlay reinforcement is "finish tempered" at 1220° F. for a "dwell" time of about 40-42 minutes per inch of CST, plus a "soak" time of one hour, Following this procedure, the yield strength of the F22 base material will be about 85,000 psi, and the yield strength of the inlaid INCONEL 725 will be greater than 115,000 psi. Additionally, the finish tempering process will also serve to relieve the residual stresses in the heat-affected zones of the welds, so there is no need for supplemental PWHT.

In another embodiment, an annular BOP body may be fabricated from ring forgings of 8630 Modified which have been quenched and snap-tempered to about 900° F. at 30 minutes per inch of critical section "dwell" time plus one hour "soak" time. The Q&ST rings may be stacked together and full-penetration welded end-to-end. The welded stack of Q&ST rings may be machined and selectively reinforced with INCONEL 725 weld inlay material, then finish tempered at about 1260° F. for a dwell time of about 30-45 minutes per inch of CST dwell time, plus a soak time of about one hour.

Supplemental Age-Hardening

As described above, the clad material may be supplementally age-hardened to increase the yield strength of the clad material. Supplemental age-hardening may achieve the properties required of both the base material and the clad material. Heat may be selectively applied to at least a portion of the clad material, and in some embodiments the clad material may develop a yield strength of at least 115 ksi while the base material hardness remains Brinell 237 or less.

Supplemental age-hardening may be performed on a selectively reinforced Q&ST oilfield component in some embodiments. For example, as described above, the castings, forgings, and pressings used in oilfield equipment, having undergone Q&ST, may be finish-machined, selectively reinforced without fully tempering the castings, forgings, or pressings, and then finish tempered for a selected period of time at a selected temperature. The finish tempered oilfield component may then undergo supplemental age-hardening to further strengthen the clad material without further tempering the base material.

Supplemental age-hardening may also be performed on a conventionally quenched and final-tempered oilfield component. Castings, forgings, and pressings used in oilfield components may be fully heat-treated by processes including normalizing, austenitizing, solution annealing, tempering, age-hardening, heat treating, and other methods as known in the art to achieve the desired final base material properties before they are inlaid or overlaid with CRA material. The conventionally quenched and final-tempered oilfield component may then be supplementally aged to further strengthen the clad material without affecting the "final" temper.

During supplemental age-hardening, at least a portion of the oilfield component may be actively cooled, thereby maintaining the base material at a temperature less than a tempering temperature of the base material. As used herein, "active cooling" may include conductive cooling, forced convective cooling, heat exchange with a medium such as a moving fluid (vapor or liquid), spray cooling (e.g., a water spray on a portion of the surface), or other means of cooling known to those of skill in the art, exclusive of natural convective or still-air cooling. Active cooling may be used, for instance, where the age-hardening temperature of the clad material exceeds the tempering temperature of the base material.

In some embodiments, the base material may remain at least 50° F. below a tempering temperature of the base material during the selective age-hardening of the clad material; at least 75° F. below in other embodiments; and at least 100° F. below in other embodiments.

Figure 8B:
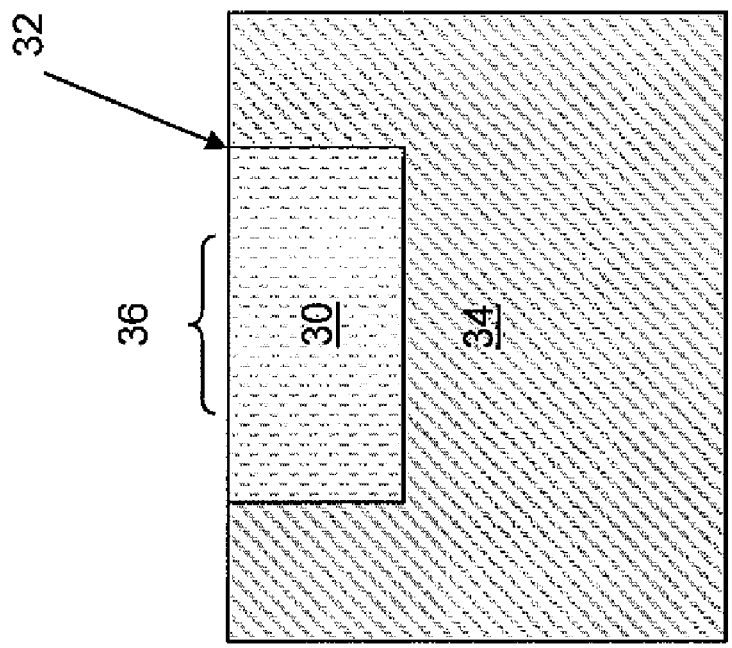
FIGS. 8A and 8B are schematic drawings of a base material having various configurations of a clad inlay in accordance with embodiments disclosed herein.
Figure 8A:
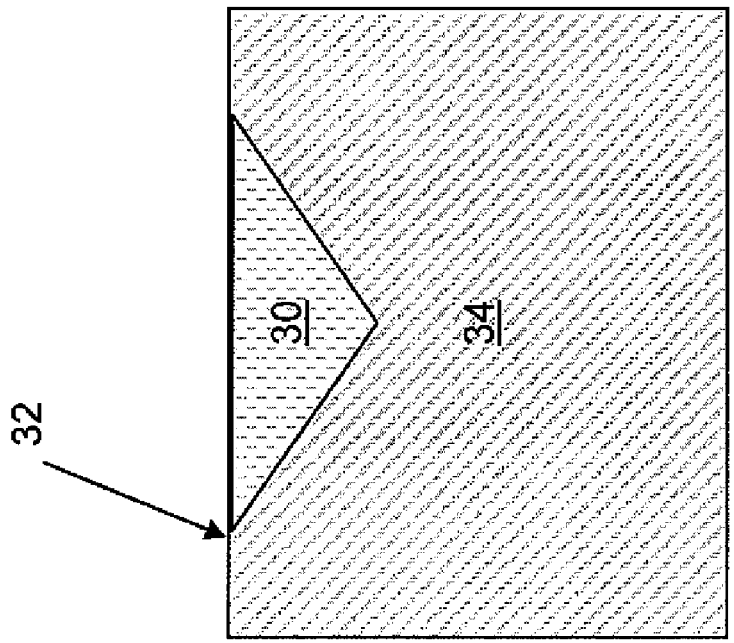

Additionally, selective reinforcement of an oilfield component may not result in a uniform thickness of clad material over an entire surface. In some embodiments, the thickness of the clad material may vary. For example, as illustrated in FIG. 8A, a selective reinforcement may be applied where a portion of the clad material 30 is thick, tapering off to a minimal thickness at a surface interface 32 of the base material 34 with the clad material 30. In other embodiments, a selective reinforcement may be applied where the clad material 30 has a uniform or nearly uniform thickness, even at the interface 32 with base material 34, as illustrated in FIG. 8B.

Where the clad material is supplementally aged, selectively heating the entire surface of the clad material may result in the base material, at or near the interface 32, exceeding the tempering temperature of the base material. To avoid exceeding the tempering temperature of the base material at or near the interface, supplemental age-hardening may include the selective heating of only a portion of the clad inlay. For example, as illustrated in FIG. 8B, the central portion 36 of clad inlay 30 may be selectively heated, where conduction may age-harden the outer portions of the clad material 30 while maintaining the temperature of the base material 34 at or near interface 32 below a tempering temperature of the base material 34. In this manner, the base material 34, even at the interface 32 with clad material 30, may remain at a hardness of Brinell 237 or less.

Figure 9A:
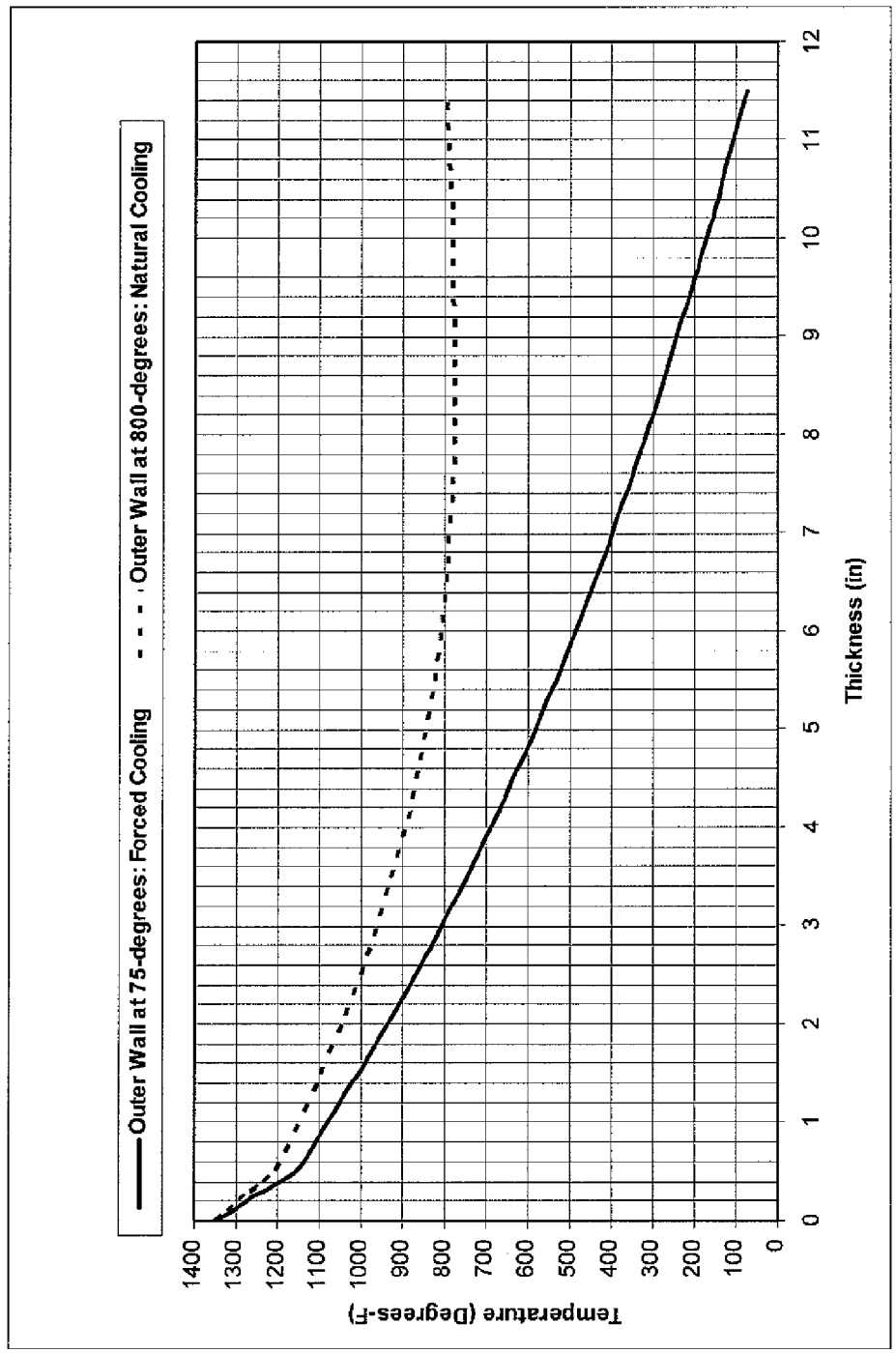
FIGS. 9A and 9B compare simulation results for selective heat treatment of a clad inlay wit forced cooling and selective heat treatment of a clad inlay with natural convective cooling of the base material, in accordance with embodiments disclosed herein.
Figure 9B:
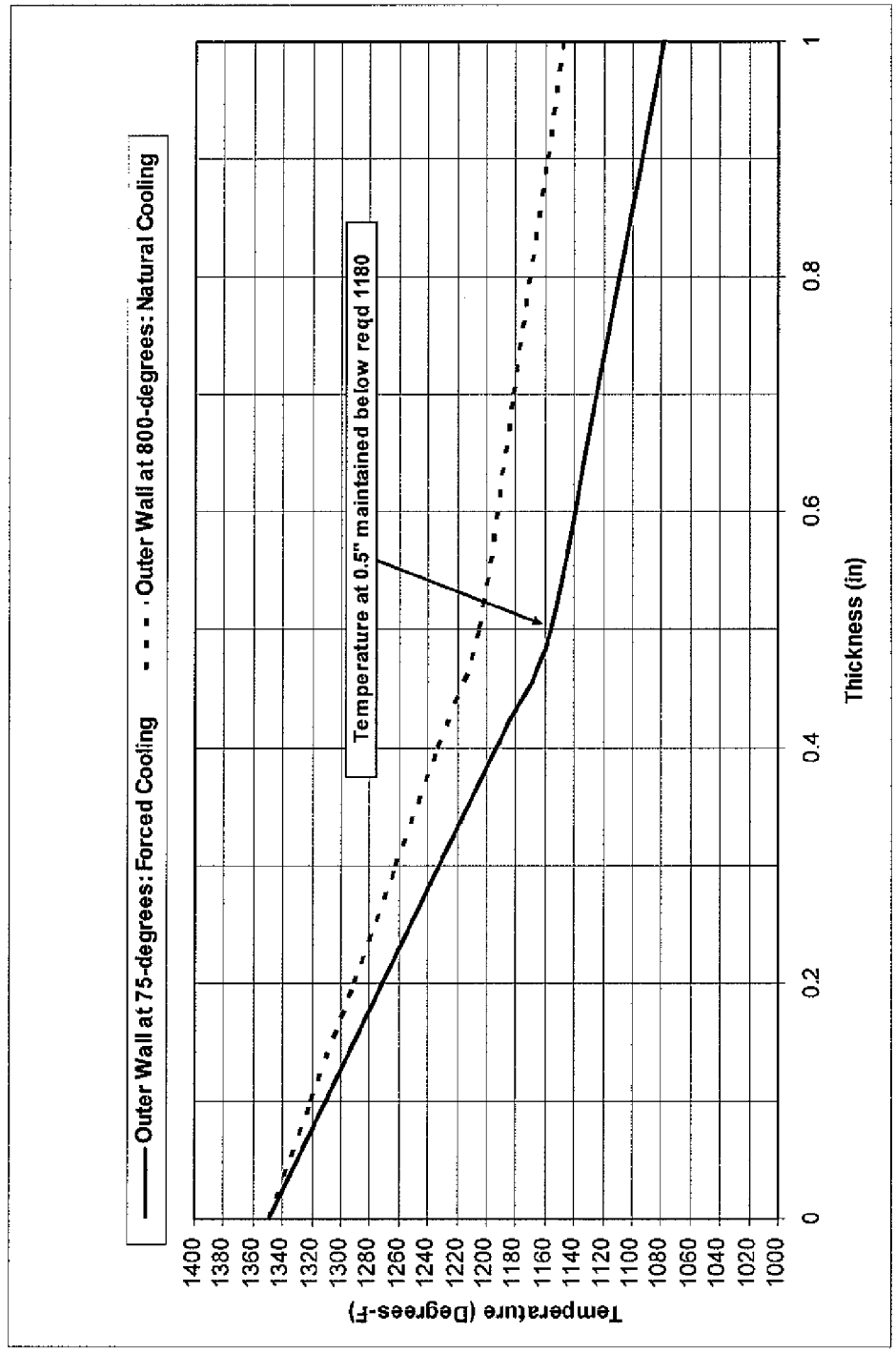

Referring now to FIGS. 9A and 9B, results of FEA simulations performed to investigate the differences between active cooling and still-air cooling of a clad inlay during a supplemental age-hardening process are shown. In this example, FEA simulations were performed on a 12 inch thick, 19 inch inner diameter cylinder of F22 having a clad inlay of 0.5 inch INCONEL 725 applied to its inner diameter. To simplify the model, a uniform inlay thickness was assumed.

The surface of the clad inlay was set at 1350° F., and the temperature of the outer surface of the cylinder was varied based upon active cooling and still-air cooling.

As shown in FIGS. 9A and 9B, still-air cooling may result in an outer wall temperature of about 800° F., whereas active cooling may maintain the outer wall temperature as low as 75° F. More importantly, active cooling may maintain the base material, at the interface with the clad material (0.5 inch depth), at a temperature less than the tempering temperature of the base material, 1180° F. In contrast, still-air cooling resulted in the base material exceeding the tempering temperature. These simulation results indicate that active cooling may provide a method to supplementally age harden a clad inlay, while maintaining the base material at a temperature below the tempering temperature of the base material.

In selected embodiments, during supplemental age-hardening, at least a portion of the clad material may be selectively heated to a temperature between about 1250° F. and 1400° F. In some embodiments, during supplemental age-hardening, at least a portion of a surface of the oilfield component may be maintained at a temperature of 250° F. or less; 200° F. or less in other embodiments; 150° F. or less in other embodiments; 100° F. or less in other embodiments; 75° F. or less in other embodiments; and 50° F. or less in yet other embodiments.

Temperature Profile/Strength Gradient

In some embodiments, oilfield components, such as ram blowout preventers, may be used in high pressure or high pressure high temperature environments, as discussed above. As such, it may be necessary to meet a minimum yield strength requirement at a particular depth from the surface. For example, for an 18¾ inch ram blowout preventer to be rated for 20,000 psi operating pressure, the ram may be required to have a minimum yield strength of 120 ksi or greater at a depth of about 0.375 inches from the internal diameter. Higher pressure ratings may require even greater yield strength at a particular depth. FEA models, as discussed above, may be used to determine the minimum yield strength requirement at a particular depth for a desired pressure rating.

Developing the required minimum yield strength at a particular depth must be accomplished without increasing the base material above the maximum allowed hardness. Supplemental age-hardening of the clad material may be used to achieve the desired properties in both the base material and the clad material, where the supplemental age-hardening may include selective heating and active cooling, as described above.

To develop the desired clad material minimum yield strength at a particular depth, the clad material may be age-hardened for a selected time and at a selected temperature profile. Age-hardening in this manner may result in the clad material developing a selected strength gradient. "Selected temperature profile" refers to developing a desired temperature gradient across the oilfield component, through selective heating and optionally active cooling, such that the clad material age-hardens to further strengthen the clad material without further tempering the base material. Because a temperature profile is imposed across the oilfield component, the clad material age-hardens to differing degrees, resulting in a strength gradient across the clad material. Thus, "selected time" refers to a time sufficient to age-harden the clad material to a desired strength at a particular depth, based upon the selected temperature profile and the minimum strength requirements at a particular depth.

Supplemental age-hardening for a selected time and at a selected temperature profile may be performed on a selectively reinforced Q&ST oilfield component in some embodiments. For example, as described above, the castings, forgings, and pressings used in oilfield equipment, having undergone Q&ST, may be finish-machined, selectively reinforced without fully tempering the castings, forgings, or pressings, and then finish tempered for a selected period of time at a selected temperature. The finish tempered oilfield component may then undergo supplemental age-hardening at a selected temperature profile to further strengthen the clad material without further tempering the base material, resulting in the clad material developing a selected strength gradient.

Supplemental age-hardening for a selected time and at a selected temperature profile may also be performed on a conventionally quenched and final-tempered oilfield component. Castings, forgings, and pressings used in oilfield components may be fully heat-treated by processes including normalizing, austenitizing, solution annealing, tempering, age-hardening, heat treating, and other methods as known in the art to achieve the desired final base material properties before they are inlaid or overlaid with CRA material. The conventionally quenched and final-tempered oilfield component may then undergo be supplemental age-hardening to further strengthen the clad material without further tempering the "final tempered" base material, resulting in the clad material developing a selected strength gradient.

The selected strength gradient may include a minimum strength at a particular depth. For example, in some embodiments, the clad material may develop a yield strength of at least 125 ksi at a surface of the clad material. In other embodiments, the clad material may develop a yield strength of at least 130 ksi at a surface of the clad material; at least 135 ksi in other embodiments; and at least 140 ksi in yet other embodiments.

In some embodiments, the clad material may develop a yield strength of at least 115 ksi at a depth of about 0.375 inches. In other embodiments, the clad material may develop a yield strength of at least 120 ksi at a depth of about 0.375 inches; at least 125 ksi in other embodiments; at least 130 ksi in other embodiments; and at least 135 ksi in yet other embodiments. In other embodiments, the clad material may develop a yield strength of at least 120 ksi at a depth of about 0.4375 inches; at least 120 ksi at a depth of about 0.500 inches in other embodiments; and at least 120 ksi at a depth of about 0.5625 inches. Thus, the minimum yield strength and the particular depth may be varied, depending on the design (e.g., regulatory) criteria applied.

Figure 10:
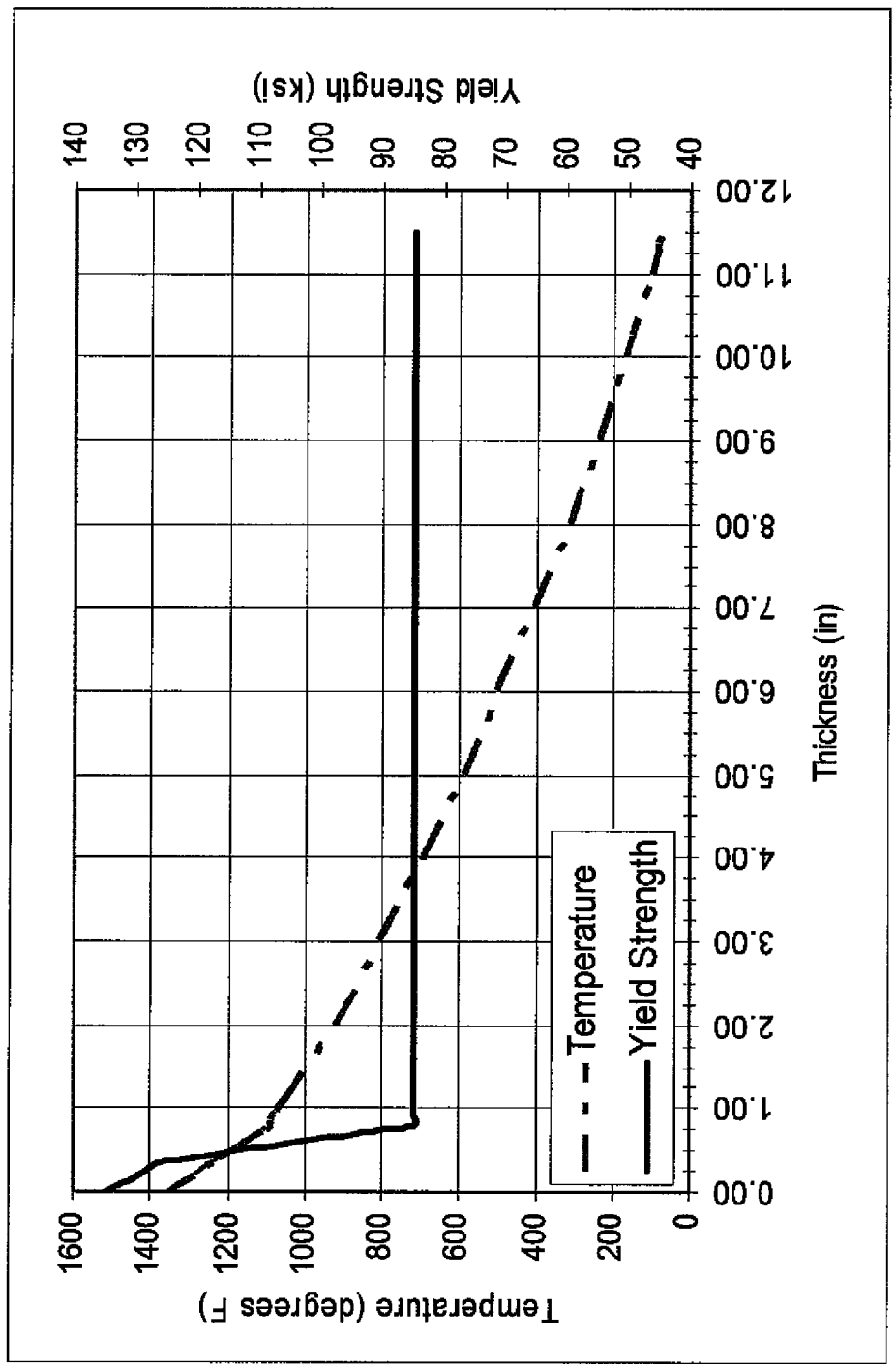
FIG. 10 graphically illustrates a strength gradient that may result from age-hardening a clad material for a selected time and at a selected temperature profile, according to embodiments disclosed herein.

FIG. 10 graphically illustrates a strength gradient that may result from age-hardening a clad material for a selected time and at a selected temperature. To simplify the graph, a 12 inch thick, 19 inch inner diameter cylinder of a base material, having a finish-temper minimum yield strength of 85 ksi, and a uniform 0.75 inch clad layer applied to the inner diameter of the cylinder are assumed.

To generate the selected temperature profile, active cooling is used to maintain the outer wall temperature at 75° F., and the clad layer is selectively heated to a surface temperature of 1350° F. Heat-aging for a selected time at the selected temperature profile may result in the clad material developing the illustrated strength profile. The surface of the clad material may develop a minimum yield strength of at least 135 ksi, whereas the clad material may develop a minimum yield strength of at least 120 ksi. The base material, throughout the entire thickness (i.e., the portion of the curve to the right of the 0.75 inch point corresponding to the interface between the base material and the clad material), is maintained at a temperature below 1100° F., below the tempering temperature of the base material, resulting in no additional age-hardening of the base material.

FIG. 10 is a simplified diagram, showing an example of a strength profile that may result from the selected temperature gradient for a non-specific clad overlay metal. Actual resulting strength gradients may depend upon the metal selected for the clad layer, the thickness of the clad layer, the selected temperature profile, and the selected time at the selected temperature profile. These variables may be manipulated according to the teachings herein to result in a selected clad material strength gradient.

Embodiments and methods disclosed herein may advantageously provide for generating and analyzing oilfield component models with FEA using stress and/or fatigue analysis to determine the component's response under fatigue loading conditions characterized by large amounts of stress. The resulting analysis may then be used to enhance component design, improving the performance of the component under fatigue loading conditions.

Advantageously, embodiments disclosed herein may provide a method to establish an overall oilfield component design based on ASME Section-VIII Div-3 or similar high-pressure, high-temperature equipment design guidelines. The component may satisfy NACE peak stress and life cycle requirements. Methods and embodiments disclosed herein may provide for oilfield components with an increased working lifespan. For example, the oilfield component may be modeled with simulated fatigue loading conditions of repeated compression, bending, etc., to determine design features that may extend the working lifespan of the oilfield component.

Advantageously, embodiments disclosed herein may provide a method to manufacture oilfield components that is less costly than attempting to manufacture the component from a solid, high strength corrosion resistant alloy or other metal that may meet the requirements of NACE MR0175. This is especially true in view of the fact that the mechanical strength of the body beneath the clad layer 0.250 to 0.500 inches from the well bore fluid wetted surfaces may be much lower than that required within localized zones subject to fatigue failure. Other embodiments may provide for the enhancement of existing component designs so that sulfide stress corrosion cracking or corrosion related limit conditions may be met by selectively reinforcing the oilfield component with higher strength material suitable for use in an oil and gas environment.

The selection of the cladding alloy may be based on the increased mechanical strength of the clad layer and may also be based on the metallurgical bond achieved between the clad layer and the substrate. An additional attribute of the clad layer may be the corrosion resistance that the cladding alloy may contribute to the oilfield component. Another attribute of the clad layer is that any scoring or gouging of the interior surface of the component is not likely to extend below the depth of the clad layer, thus allowing the clad layer to continue to protect the low-alloy steel substrate on which it is deposited. Particularly, the clad layer may also continue to protect the component from pitting corrosion often found in the cavities of oilfield components. Moreover, the repair of gouges in the clad layer may be easier and less costly to perform than the repair of similar damage to the low-alloy steel substrate.

In other aspects, embodiments disclosed herein may advantageously provide for a method to manufacture selectively reinforced oilfield components. The method may include finish tempering the oilfield component at a selected time and temperature to temper the base material and age harden the clad material used to form the selectively reinforced oilfield component. In this manner, the method may advantageously provide for developing the required properties of the base material, post-weld heat treatment of the weldment joint adjoining the base material and the clad material, and age hardening the clad material.

In other aspects, embodiments disclosed herein may advantageously provide a method to manufacture selectively reinforced oilfield components, wherein the method includes supplementally age-hardening of the clad material. In some embodiments, supplemental age-hardening the clad material may be performed for a selected time and at a selected temperature profile. In this manner, the method may advantageously provide for developing a selected strength or strength gradient in the clad material without increasing the base material above the maximum allowed hardness.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A process to manufacture an oilfield component, the process comprising:
   selectively reinforcing a base material with an age-hardenable clad material; and
   age-hardening the clad material for a selected time and at a selected temperature profile;
   wherein the age-hardening results in the clad material developing a selected strength gradient;
   wherein the base material comprises a snap-tempered forging;
   the process further comprising finish tempering the oilfield component at a selected time and a selected temperature to temper the base material and age harden the clad material; and
   wherein the age hardening comprises selectively heating at least a portion of the clad material such that the clad material age-hardens and the base material remains below a tempering temperature of the base material.

2. The process of claim 1, further comprising:
   analyzing a first model of the oilfield component;
   identifying regions of high stress concentration in the first model at a selected loading condition;
   constructing the oilfield component; and
   wherein the selectively reinforcing comprises selectively reinforcing the identified regions of high stress concentration corresponding to the constructed oilfield component.

3. The process of claim 2, further comprising determining a minimum strength requirement at a particular depth.

4. The process of claim 1, wherein the strength gradient comprises a minimum strength at a particular depth.

5. The process of claim 1, wherein the clad material develops a yield strength of at least 135 ksi at a surface of the clad material.

6. The process of claim 5, wherein the clad material develops a yield strength of at least 120 ksi at a depth of about 0.375 inches.

7. The process of claim 1, wherein the clad material develops a yield strength of at least 120 ksi at a depth of about 0.375 inches.

* * * * *